Figures 2, 3:
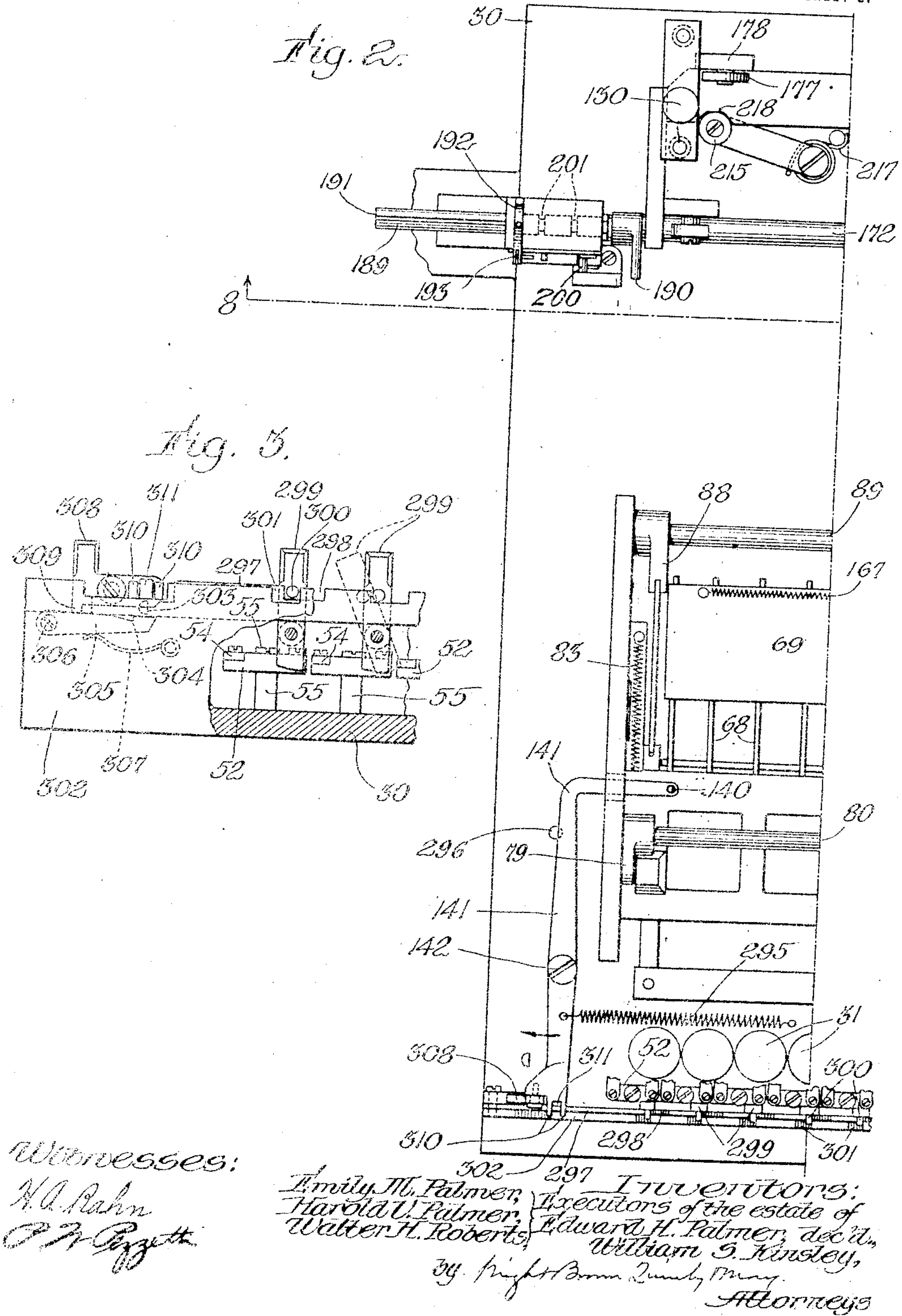

E. H. PALMER & W. S. KINSLEY.
E. H. & H. V. PALMER & W. H. ROBERTS, EXECUTORS OF E. H. PALMER, DEC'D.
CALCULATING APPARATUS.
APPLICATION FILED MAY 29, 1913.

1,212,251.

Patented Jan. 16, 1917.
11 SHEETS—SHEET 2.

Witnesses:
H. A. Rahn
P. W. Pezzetti

Emily M. Palmer,
Harold V. Palmer,
Walter H. Roberts,
Executors of the estate of
Edward H. Palmer, dec'd.,
William S. Kinsley,
Inventors:
By Wright, Brown, Quinby & May
Attorneys

E. H. PALMER & W. S. KINSLEY.

E. M. & H. V. PALMER & W. H. ROBERTS, EXECUTORS OF E. H. PALMER, DEC'D.

CALCULATING APPARATUS.

APPLICATION FILED MAY 29, 1913.

1,212,251.

Patented Jan. 16, 1917.

11 SHEETS—SHEET 1.

Witnesses:
H. A. Rahn
P. W. Pezzetti

Emily M. Palmer,
Harold V. Palmer,
Walter H. Roberts

Inventors:
Executors of the estate of
Edward H. Palmer, dec'd.
William S. Kinsley.

by Nigh, Brown, Quinby & May.
Attorneys

E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251.

Patented Jan. 16, 1917.
11 SHEETS—SHEET 3.

Witnesses:
H. A. Rahn
P. F. Pizzetti

Emily M. Palmer,
Harold V. Palmer
Walter H. Roberts,
Executors of the estate of Edward H. Palmer, dec'd.
Inventors:
William S. Kinsley.
by Wright Brown Quinby & May
Attorneys E. H. PALMER & W. S. KINSLEY,
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251.

Patented Jan. 16, 1917.
11 SHEETS—SHEET 4.

Witnesses:
H. A. Rahn
P. H. Pezzetti

Emily M. Palmer,
Harold V. Palmer,
Walter H. Roberts,
Executors of the estate of Edward H. Palmer, dec'd, Inventors:
William S. Kinsley, by Wright, Brown, Quinby & May
Attorneys E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.
1,212,251. Patented Jan. 16, 1917.
11 SHEETS—SHEET 5.
Fig. 10.
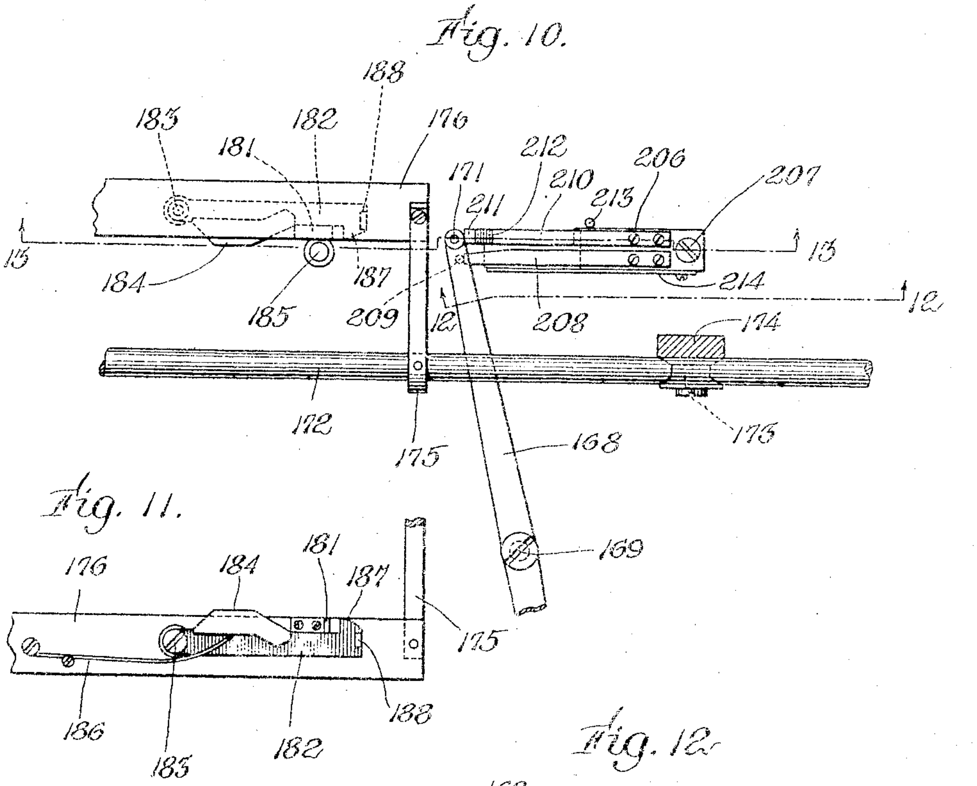
Fig. 10, Fig. 11.
Fig. 12.
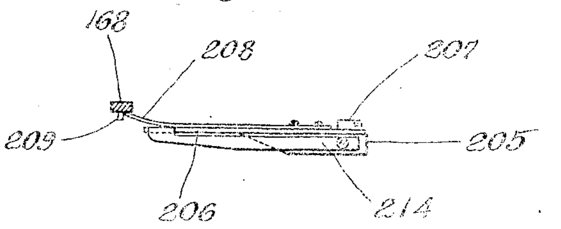
Fig. 13.
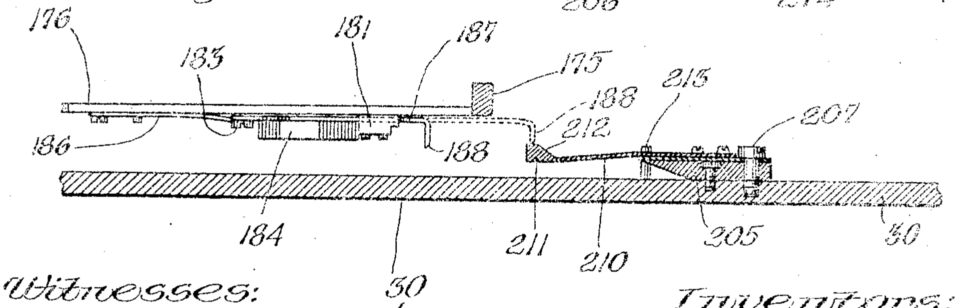
Witnesses:
H. A. Rahn
O. F. Pezzetti
Inventors:
Emily M. Palmer, Harold V. Palmer, Walter H. Roberts } Executors of the estate of Edward H. Palmer, dec'd.,
William S. Kinsley,
by Attorneys.

E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251. Patented Jan. 16, 1917.
11 SHEETS—SHEET 6.

Witnesses:
H. A. Rahn
P. W. Pezzetti

Inventors:
Emily M. Palmer,
Harold V. Palmer,
Walter H. Roberts,
Executors of the estate of Edward H. Palmer, dec'd,
William S. Kinsley,
by [signature] Attorneys.

E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251.

Patented Jan. 16, 1917.
11 SHEETS—SHEET 7.

Witnesses:
H. A. Rahn
P. R. Pezzetti

Emily M. Palmer;
Harold V. Palmer;
Walter H. Roberts

Inventors:
Executors of the estate of
Edward H. Palmer, dec'd.
William S. Kinsley,
by Wright Brown Quinby May
Attorneys.

E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251. Patented Jan. 16, 1917.

11 SHEETS—SHEET 8.

Witnesses:
H. A. Rahn
P. W. Pezzetti

Inventors:
Emily M. Palmer, Harold V. Palmer, Walter H. Roberts, Executors of the estate of Edward H. Palmer,
William S. Kinsley,
by Knight Brown Quinby May
Attorneys.

Witnesses:
H. A. Rahn
P. W. Pezzetti

Inventors:
Emily M. Palmer,
Harold V. Palmer,
Walter H. Roberts, } Executors of the estate of Edward H. Palmer, dec'd,
William S. Kinsley,
by Wright Brown Quinby & May
Attorneys.

E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251.

Patented Jan. 16, 1917.
11 SHEETS—SHEET 10.

Witnesses:
H. A. Rahn
P. F. Pizzetti

Inventors:
Emily M. Palmer, Harold V. Palmer, Walter H. Roberts, Executors of the estate of Edward H. Palmer, dec'd.
William S. Kinsley.
by Wright, Brown, Quinby & May
Attorneys E. H. PALMER & W. S. KINSLEY.
E. M. & H. V. PALMER & W. H. ROBERTS, EXECUTORS OF E. H. PALMER, DEC'D.
CALCULATING APPARATUS.
APPLICATION FILED MAY 29, 1913.

1,212,251. Patented Jan. 16, 1917.

11 SHEETS—SHEET 11.

Witnesses:
H A Rahn
P. W. Pezzetti

Inventors:
Emily M. Palmer, Harold V. Palmer, Walter H. Roberts } Executors of the estate of Edward H. Palmer, dec'd,
William S. Kinsley,
by Wright Brown Quinby May
Attorneys

UNITED STATES PATENT OFFICE.

EDWARD H. PALMER, DECEASED, BY EMILY M. PALMER AND HAROLD V. PALMER, OF READING, MASSACHUSETTS, AND WALTER H. ROBERTS, OF MELROSE, MASSACHUSETTS, EXECUTORS; AND WILLIAM S. KINSLEY, OF READING, MASSACHUSETTS; SAID KINSLEY ASSIGNOR TO SAID EMILY M. PALMER, HAROLD V. PALMER, AND WALTER H. ROBERTS, EXECUTORS; SAID EXECUTORS ASSIGNORS TO EMILY M. PALMER AND HAROLD V. PALMER, INDIVIDUALLY.

CALCULATING APPARATUS.

1,212,251. Specification of Letters Patent. Patented Jan. 16, 1917.

Application filed May 29, 1913. Serial No. 770,661.

*To all whom it may concern:*

Be it known that EDWARD H. PALMER, late a citizen of the United States, deceased, and WILLIAM S. KINSLEY, a citizen of the United States, and resident of Reading, county of Middlesex, State of Massachusetts, have invented certain new and useful Improvements in Calculating Apparatus, of which the following is a specification.

This invention relates to calculating apparatus especially adapted for operation simultaneously with a typewriting machine under the control of the latter, for indicating totals of figures which are being written on a sheet by a type-writing machine.

The especial objects of the present invention are to provide improved means whereby the calculating apparatus may be operated by power, or in other words, to connect power up to the calculating mechanism whenever a numeral key of the typewriting machine is actuated.

A further object is to provide means whereby the operative combination between the typewriting machine and the calculating apparatus may be effected without making any positive connections between the two.

A further object of the present invention is to provide an improved compound carriage for effecting the actuation of the reciprocating slides which transmit motion to the counters.

A further object is to provide an improved selector mechanism for connecting the counter that is to be actuated according to the position of the typewriter carriage, with any numeral key that is to be used.

A further object is to provide means for preventing any step movement of the typewriter carriage until the actuation of any counter has been completed.

A further object is to provide improved mechanism for intermittently connecting the typewriter carriage with the selecting mechanism.

Another object is to provide improved control mechanism relating to the connections for determining the actuation of a counter by the power mechanism when said power mechanism is permitted to operate by the movement of a typewriter numeral key lever.

A further object of the invention is to provide improved combination spindles for the counters.

A further object is to provide a calculating mechanism with tabulating devices which are entirely separate from or independent of the typewriting machine, but which will locate on the sheet the columns of figures that are being written and added or subtracted.

Another object is to provide an improved carrying-resetting mechanism.

Another object is to provide means for quickly disassociating the calculating mechanism from the typewriting machine, without having to actually disconnect any parts.

A further object is to provide improved means for locking the mechanism operated by one numeral key lever of the typewriting machine to prevent a second operation thereof, and to also lock all of the other mechanisms operated by their numeral key levers, until the complete cycle of movements of the different parts of mechanism has been effected by power.

A further object is to provide means whereby, after the operator has started to actuate one group of mechanism, the operator has no further control of the machine, so that no further operation can be performed until the power has completed the cycle of movements initiated by the operator.

A further object is to provide means for preventing the shifting of the carriage of the typewriting machine during the operation of a cycle of movements of the calculating mechanism.

A further object is to provide improved means for effecting subtraction instead of addition.

Another object is to provide improved means for resetting the calculating mechanism to zero.

Another object is to provide improved means under the actual control of the operator for rendering it certain that all of the parts are in proper position relatively to each other to be actuated by the power mechanism.

Further objects are to provide improvements which will be hereinafter described.

Figure 1:
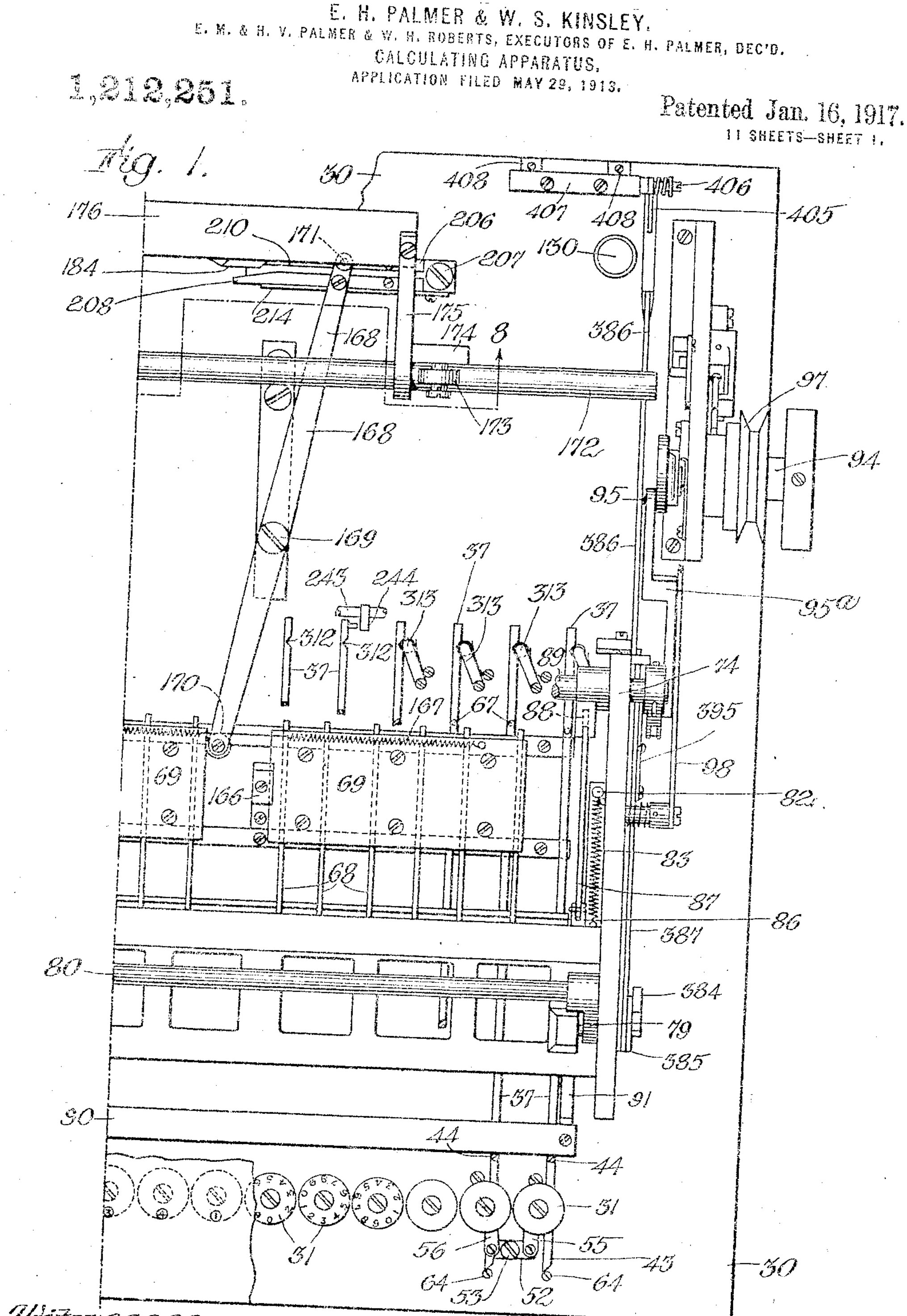
Figures 4, 5, 6:
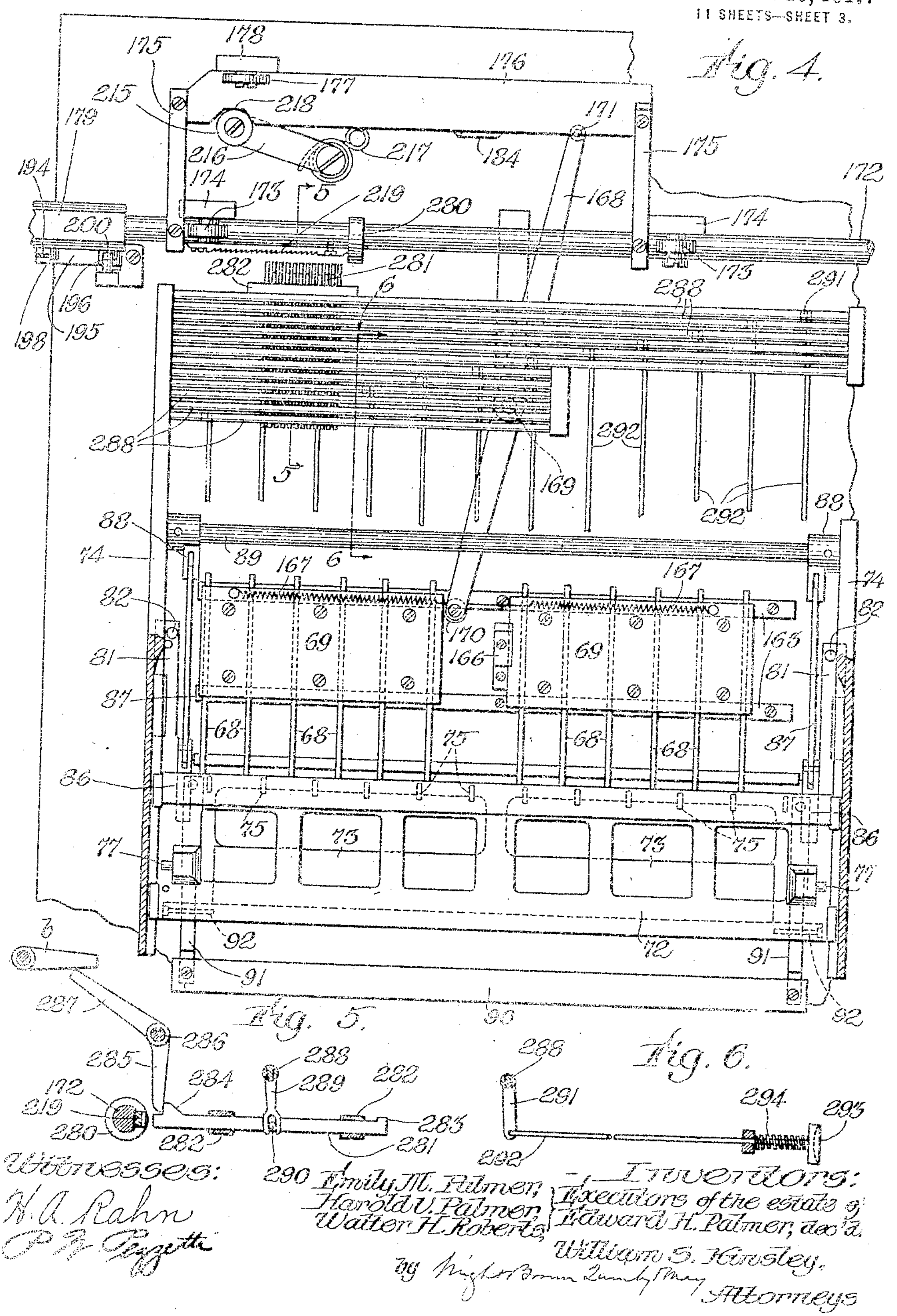
Figures 7, 8, 9:
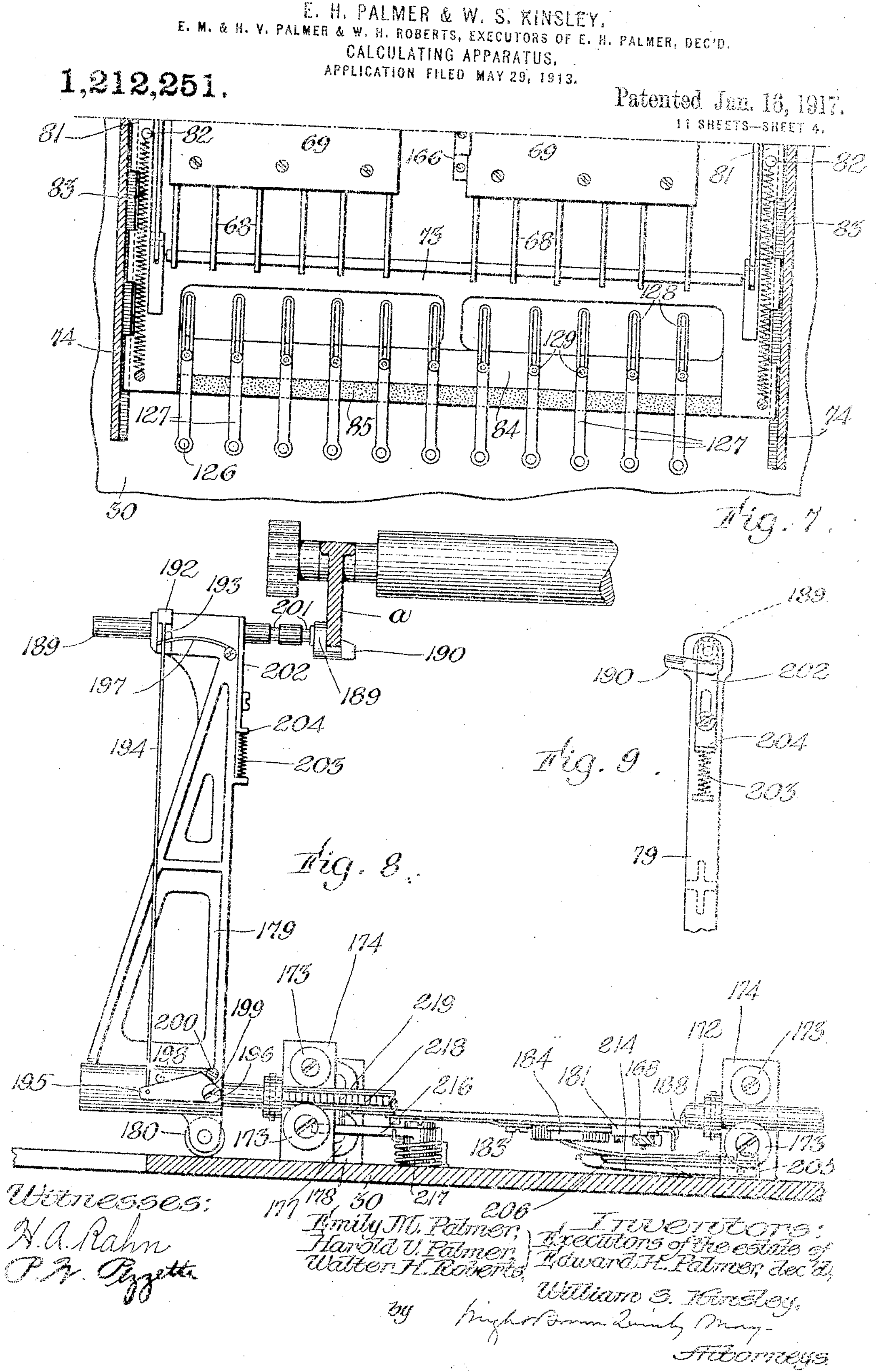
Figures 14, 15, 16, 17, 18:
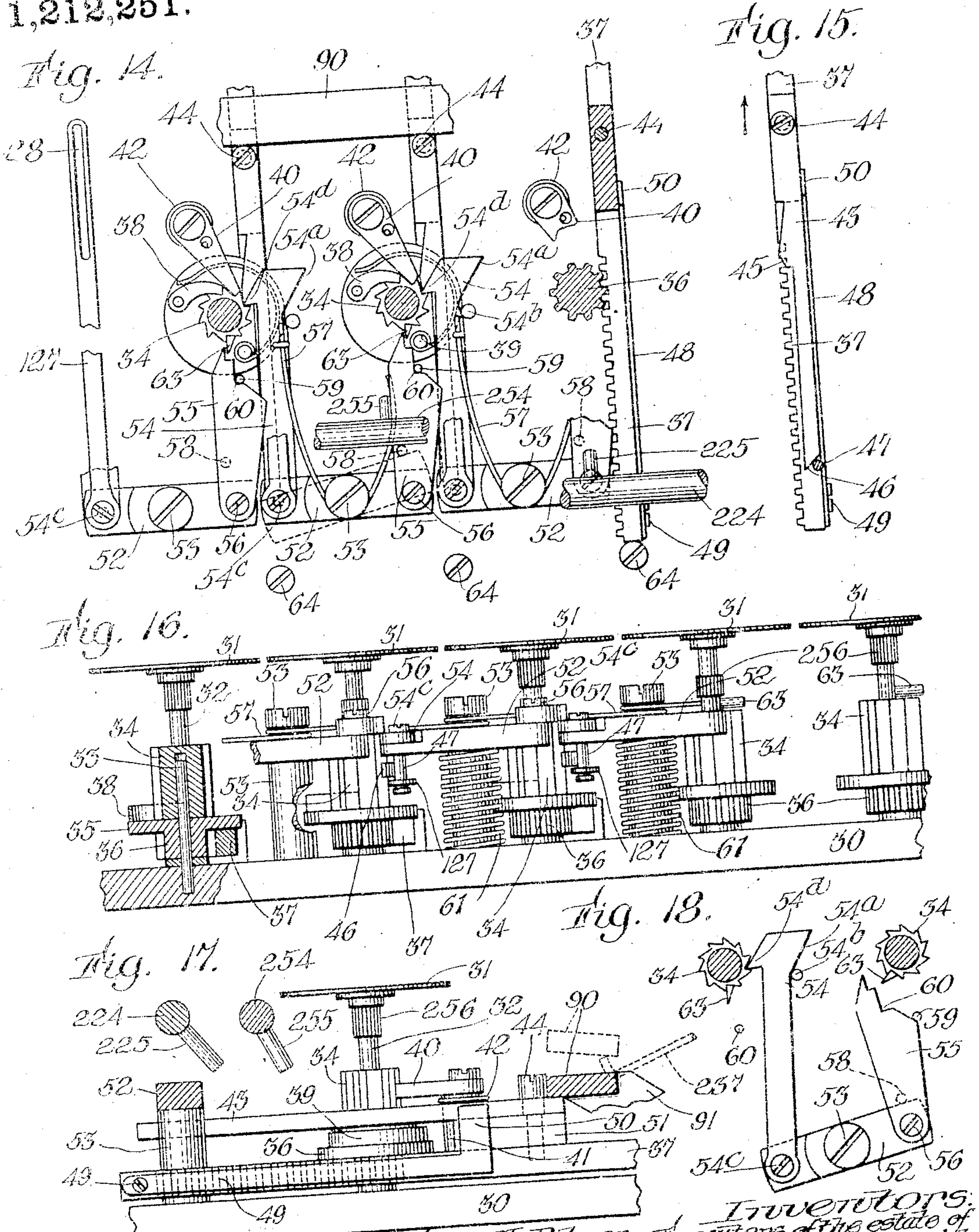
Figure 19:
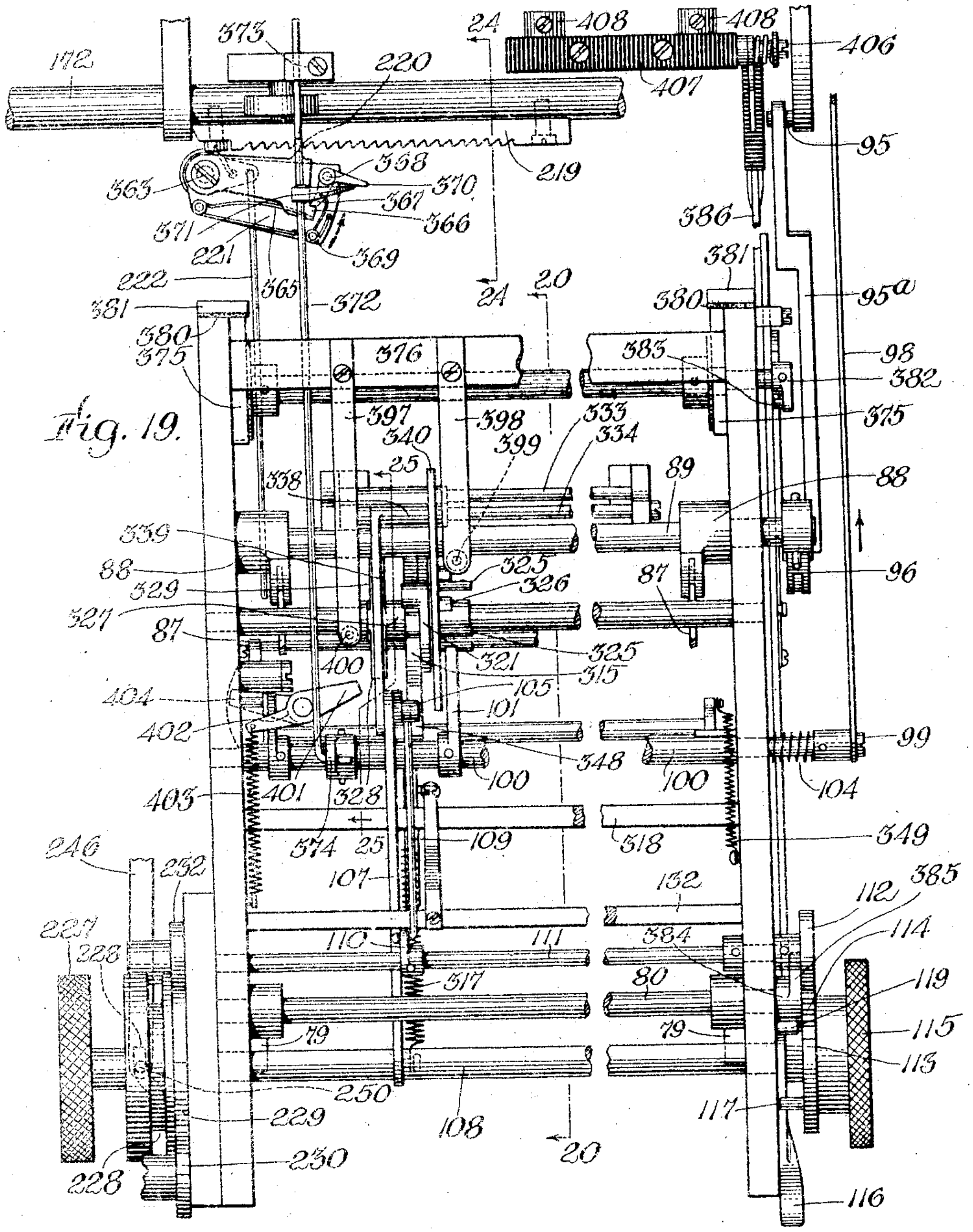
Figure 20:
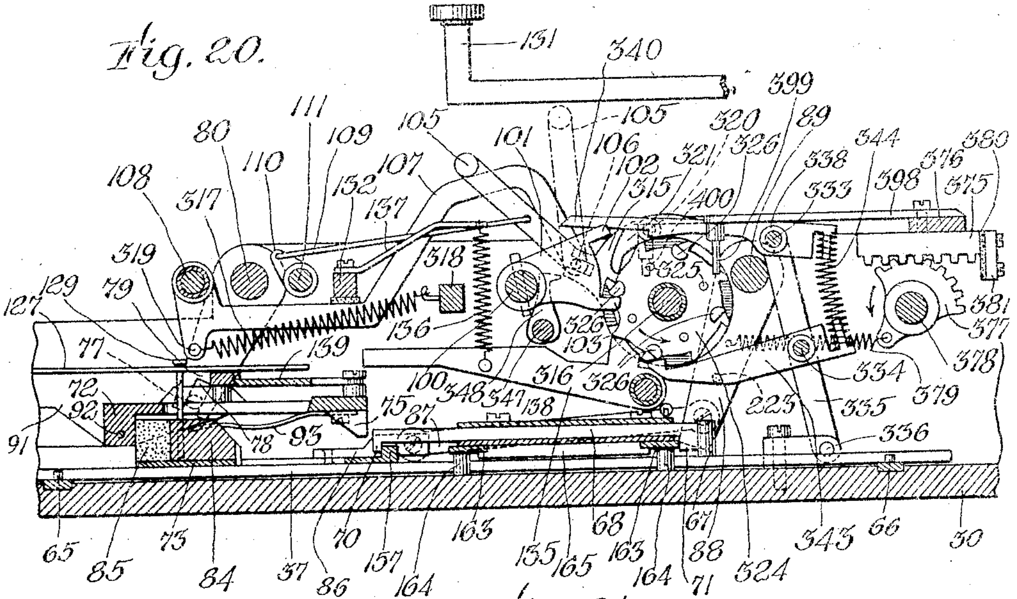
Figure 21:
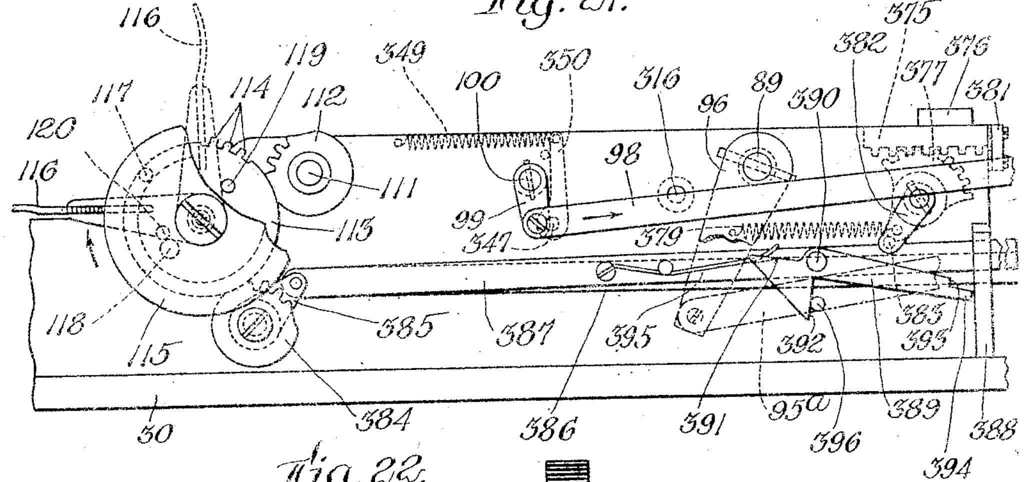
Figure 22:
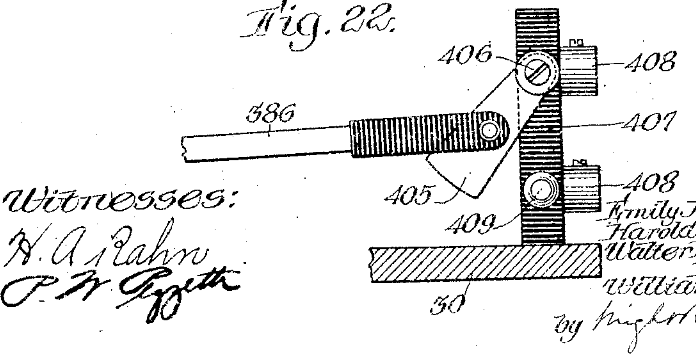
Figure 23:
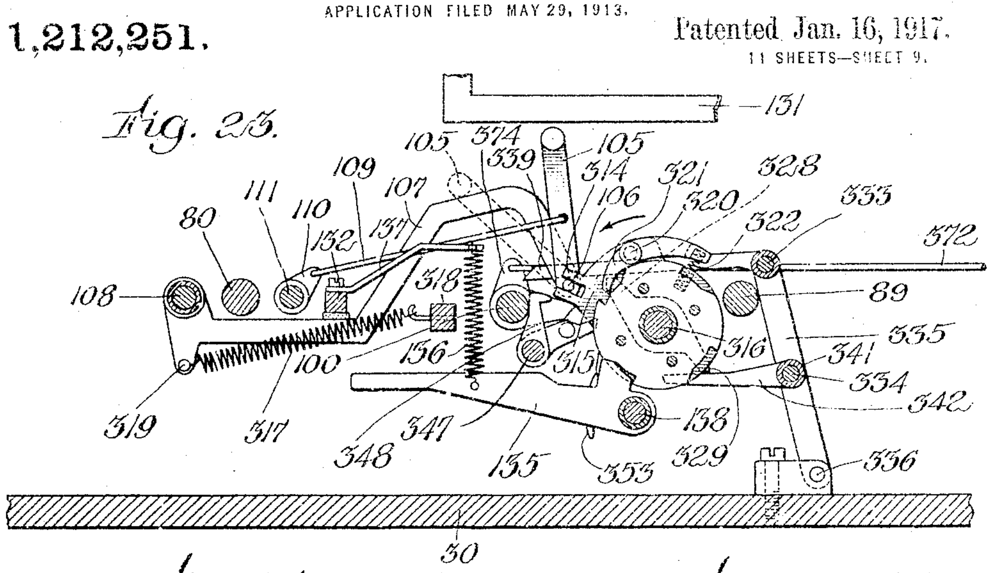
Figures 24, 25, 26, 27, 28:
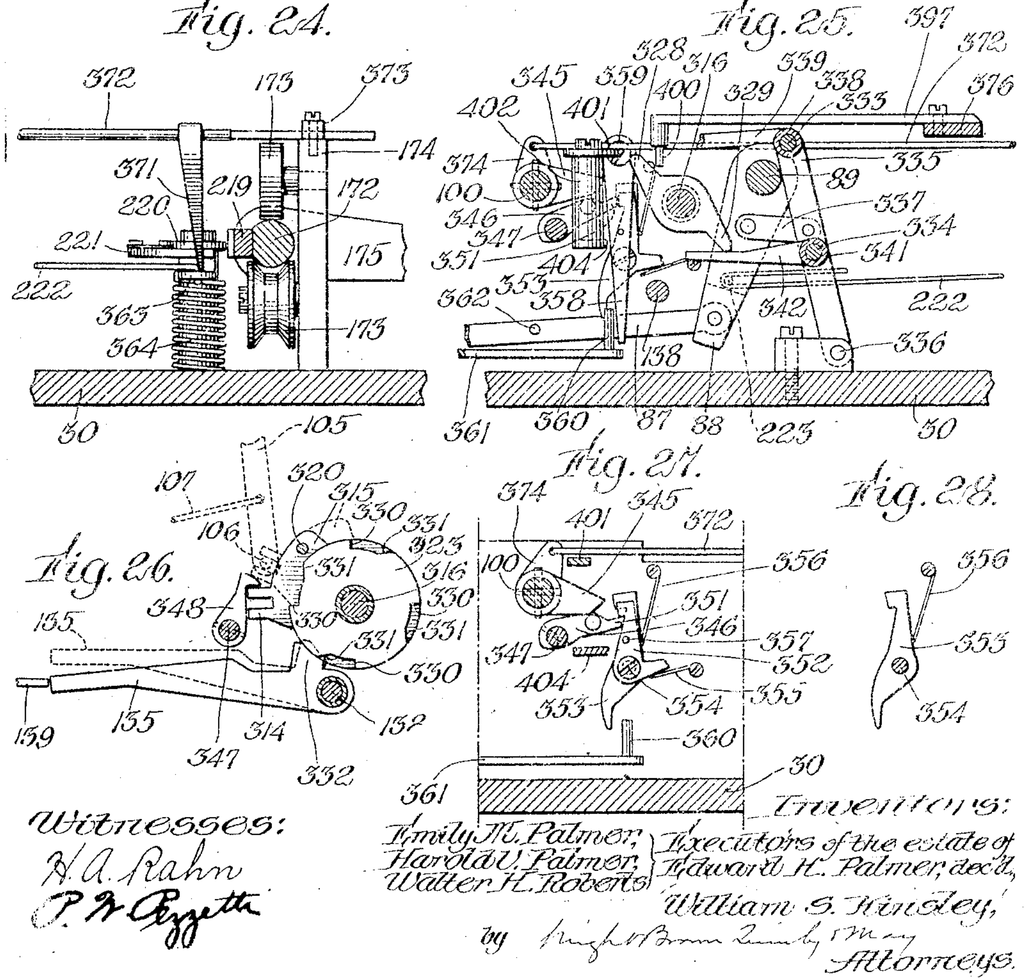
Figures 29, 30, 31, 32, 33, 34:
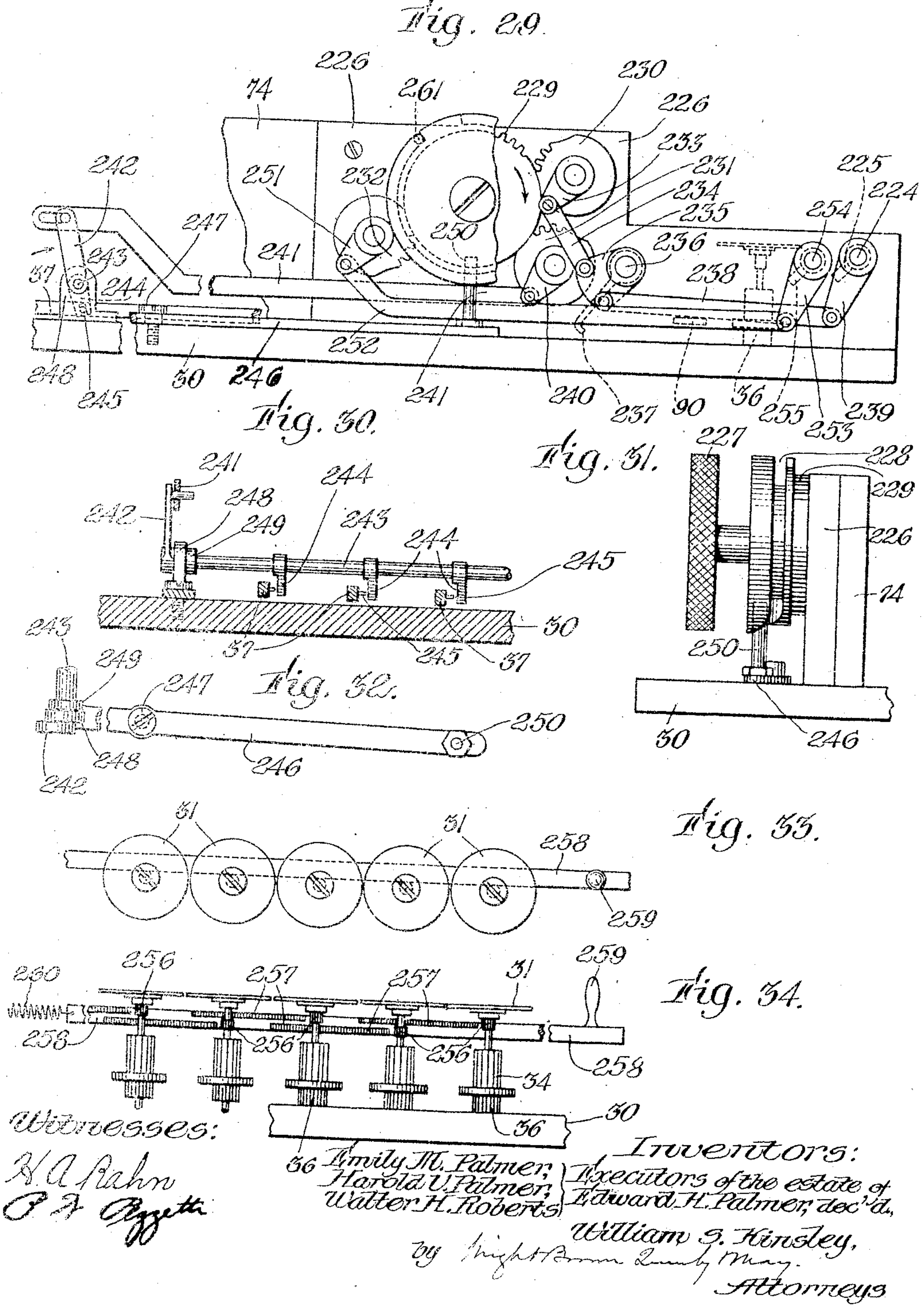
Figure 35:
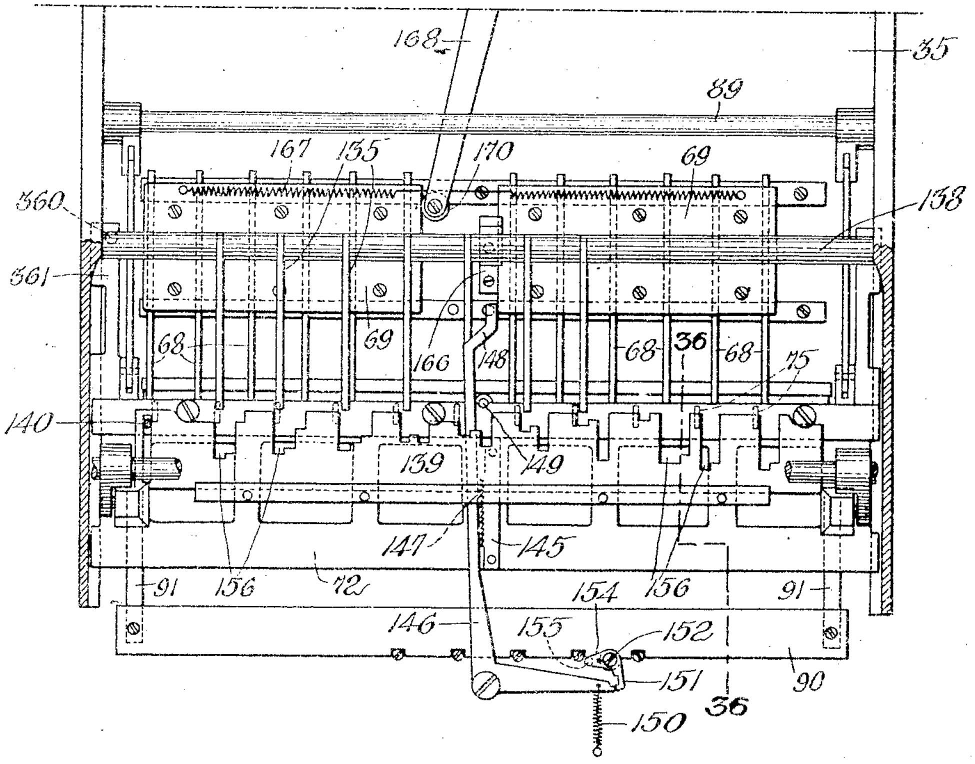
Figure 36:
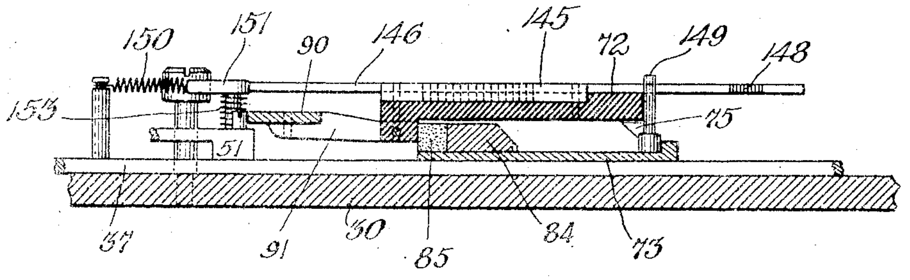

Of the accompanying drawings,—Figure 1 is a plan view of the right-hand portion of the calculating apparatus above which the typewriting machine is to be placed, the tabulating mechanism being omitted. Fig. 2 is a similar view of the left-hand portion of the apparatus, partly broken out; Figs. 1 and 2 together present a plan view of the complete apparatus. Fig. 3 is a front elevation of parts of the subtraction mechanism shown at the bottom of Fig. 2, on a larger scale. Fig. 4 is a view similar to a portion of Fig. 1 omitting some of the parts, but including the tabulating devices. Figs. 5 and 6 are detail sections on lines 5—5 and 6—6 of Fig. 4. Fig. 7 is a detail plan view of the resetting mechanism. Fig. 8 represents a section on line 8—8 of Figs. 1 and 2, illustrating the members of the selecting mechanism. Fig. 9 is an elevation of the upper portion of Fig. 8, looking from the right. Fig. 10 is a detail top plan view of the locking mechanism for the selector. Fig. 11 is a bottom plan view of a portion of Fig. 10. Fig. 12 is a detail elevation on line 12—12 of Fig. 10. Fig. 13 is a detail elevation and part section on line 13—13 of Fig. 10. Fig. 14 is a detail plan view, partly in section, of portions of the counter actuating devices. Fig. 15 is a detail plan view, partly broken out or in section, of one of the counter actuating rack bars. Fig. 16 is a detail front elevation, partly broken out, or in section, of the counting mechanism. Fig. 17 is a detail elevation, partly broken out or in section, looking from the right in Fig. 16. Fig. 18 is a detail view of parts of the mechanism shown in Fig. 14, to illustrate different positions of some of the parts. Fig. 19 is a plan view of parts of the mechanism on a larger scale than Figs. 1 and 2, some of the mechanism being omitted for the sake of clearness. Fig. 20 represents a section on line 20—20 of Fig. 19, looking in the direction of the arrows. Fig. 21 is an elevation from the right of Fig. 19, some parts being omitted. Fig. 22 is a detail of the switch for controlling the current to the motor for operating the calculating mechanism. Fig. 23 is a view similar to a portion of Fig. 20, showing the parts in other positions. Fig. 24 represents a detail section on line 24—24 of Fig. 19. Figs. 25, 26, 27 and 28 are detail sectional elevations of the mechanism illustrated chiefly in Fig. 23. Fig. 29 is a detail elevation from the left of Fig. 19. Fig. 30 is a detail elevation, partly in section, from the left in Fig. 29. Fig. 31 is a detail front elevation of the mechanism shown at the lower left-hand corner of Fig. 19. Fig. 32 is a detail plan view of the lever which is actuated by the cam shown in Fig. 31. Figs. 33 and 34 are, respectively, detail, plan and front elevations of the counters and some of the coacting parts. Fig. 35 is a plan view of the selector mechanism and other parts shown in Fig. 1, other parts being omitted for the sake of clearness. Fig. 36 is a detail section on line 36—36 of Fig. 35 on a larger scale, to illustrate the mechanism for preventing forward rebound of the actuating carriage.

Similar reference characters indicate the same or similar parts in all of the views.

The embodiment of the invention illustrated in the drawings is designed for operation in connection with one of the standard models of typewriting machines, such as that known as the "L. C. Smith". It is to be understood, however, that the invention is equally as well adaptable for use in connection with other typewriting machines. As the only connection between the typewriting machine and the calculating machine is that which results from merely setting the former upon the latter, or in other words, utilizing the calculating machine as an under structure or sub-base on which the frame of the typewriting machine is removably supported, it is deemed unnecessary to illustrate herein any portion of a typewriting machine further than to show in Fig. 20 what the relative positions of the numeral levers of the typewriting machine would be relatively to the parts of the calculating machine, the actuation of which is controlled by said numeral key levers. A suitable base plate, which may be more or less skeleton for the sake of lightness, is indicated at 30. To avoid complexity of illustration the drawings indicate such base as a solid or continuous plate.

The circular indicating disks of the machine are illustrated at 31 in Figs. 1 and 2, said disks being provided with numerals from one to naught, adapted to show successively through openings provided in a cover plate. As best shown in Figs. 15, 16 and 17, each indicating disk 31 is carried by, so as to rotate with, a spindle 32 mounted to rotate on a fixed pin 33 rising from the base 30. The spindle 32 is provided with a vertically elongated ratchet pinion 34. The spindle 32 and its ratchet pinion 34 are supported on a disk 35 having a spur pinion 36, said disk and pinion being mounted to oscillate on the fixed pin 33, oscillation being effected by means of an actuating bar having its front end formed with teeth to constitute a rack meshing with the spur pinion 36. By a mechanism presently described each actuating bar 37 is reciprocated to a greater or less extent according to the amount that is to be added or subtracted. The disk 35 carries a pawl 38 held by means of a spring 39 in engagement with the lower end of the ratchet pinion 34. Suitable guides are provided to keep the rack ends of the bars 37 in engagement with the pinion 36. Each ratchet pinion 34 is engaged by a detent 40 suitably mounted as by means of a post 41, a spring 42 (Fig. 17) being employed to preserve the engagement of the detent with the ratchet pinion to prevent retrograde movement of the pinion and indicating disk 31. To prevent over-motion of the ratchet pinion 34 and its indicating disk 31, we provide a lock mechanism comprising a light bar 43 (Fig. 15) pivoted at 44 to the actuating bar 37 and having a blunt tooth 45 and having its outer forward end beveled or inclined as at 46 adapted to coact with a pin 47 supported by a part of the carrying mechanism hereinafter described. The lock bar 43 is held in its normal position by a light spring 48 secured at one end as by a screw 49 to one side of the bar 37 and having its free end extending upwardly, the tip 50 (Fig. 17) of said free end bearing against the side of the lock bar 43. To facilitate an understanding of the operation of this portion of the machine, it is to be understood that the actuating bars are normally in the positions indicated in Figs. 14 and 15, that when a numeral key lever of the typewriter is depressed, the selected actuating bar is moved rearwardly, or in the direction of the arrow in Fig. 15, and that when the actuating bar is returned by the power mechanism hereinafter described, said actuating bar reassumes the position shown in Figs. 14 and 15, and stops at a point with the blunt tooth 45 engaging the space between two teeth of the ratchet pinion 34, thus preventing over-motion of the latter by momentum. As the actuating bar 37 moves in a direction the reverse of the arrow in Fig. 15, during the movement of actuating the indicating or counting disk, the beveled end 46 of the lock bar 43 engages the pin 47 so as to hold said lock bar with its tooth 45 firmly engaging the ratchet pinion. When the next movement of said bar 37 occurs in the direction of the arrow in Fig. 15 said beveled end 46 leaves the pin 47 and the tooth 45 leaves the ratchet pinion, but the latter cannot rotate backwardly because of the detent 40. As shown in Fig. 17, the lock bar 43 is sustained at a suitable elevation above the bar 37 so as to engage the ratchet pinion 34 above the pawl 38, as by means of a block 51 interposed between said bars 37 and 43.

In order to carry tens from one indicator to the indicator next to the left of that in actuation, we provide a series of short flat bars 52 pivotally mounted upon posts 53 rising from the base 30, see Figs. 1, 3, 14, 16 and 18. Each bar 52 carries at its left-hand end an arm 54 pivoted at $54^{c}$, said arm 54 extending backward slightly beyond the ratchet pinion at the left, and said bar 52 carries at its right-hand end an arm 55 pivoted at 56 and terminating a little short of the periphery of the ratchet pinion at its right. Stop pins 58 set in the base limit forward motion of the ends of bars 52 which carry the arms 54. The rear end of arm 54 is given the form of a ratchet tooth $54^{d}$ positioned to enter the teeth of the ratchet pinion next adjacent to the left, while the arm 55 has a notch 60 cut from its rear end to engage a pin 59 fixed in the base plate. The detents 40 may be omitted excepting for the pinion 34 of the extreme right-hand or "cent" indicator, because the teeth $54^{d}$ of the arms 54 and the pawls 38 will serve sufficiently as detents. Both arms 54, 55 are caused to find their operative position by force of a spring 57 coiled around the post 53 and suitably engaged at its ends with said arms. Each vertical ratchet pinion 34 carries affixed to its upper part a radially projecting tooth 63 (Fig. 16) so situated that once in each rotation of said pinion, this projecting tooth will contact with the pivotally mounted arm 55, rocking it out of connection with restraining pin 59 and permitting a spring 61, (Fig. 16) which is coiled on post 53 and attached to the bar 52 and the base, to swing said bar and move the arm 54 a sufficient distance to rotate the ratchet pinion 34 adjacent at the left, with which it is engaged, one tooth, thereby carrying one ten to the indicator of next higher denomination.

As indicated in Fig. 16, the pin 47 hereinbefore described is a downwardly extending portion of the pivot pin $54^{c}$. When the bar 52 is moved to carry onto the next indicator, the pin 47 is thrown forward and out of contact with the beveled tip 46 of lock bar 43, thereby instantly releasing the lock and permitting the ratchet pinion to be rotated to bring the numeral of the next higher value to the view point. The right-hand edge of arm 54 is provided with a wedge-shaped projection or cam surface $54^{a}$, commencing nearly opposite its single ratchet tooth and inclined toward the right in approaching the rear end of said arm. When the arm 54 is in its rear position, ready for carrying, the cam surface $54^{a}$ is just out of contact with an abutment pin $54^{b}$, but upon forward motion of the arm 54 to rotate a ratchet pinion one tooth this cam edge $54^{a}$ contacting with abutment $54^{b}$ deflects the rear end of arm 54 toward its ratchet pinion, thereby pressing the point of the ratchet tooth firmly against the pinion and locking it against any greater motion than the one-tenth of a revolution desired.

To positively limit the extent to which the bars 37 may move forwardly we provide means such as stop pins 64 (Fig. 14) rising from the base. An extension of the right-hand pin 64 acts in connection with the beveled end of the bar 43 for the "cents" mechanism, the same as the pins 47 for the mechanisms indicating higher values.

The actuating bars 37 reciprocate between suitable front guides indicated at 65 in Fig. 20, and rear guides indicated at 66 in Fig. 20. The two figures, 17 and 20, although on slightly different scales, are to be referred to together to indicate nearly a complete section from front to rear of the machine. Each bar 37 is provided with an upwardly projecting pin 67, which is engaged by a mechanism presently described when said bar is to be pushed backwardly or in the direction of the arrow, Fig. 15. Each pin 67 is in the path of rearward movement of a slide 68, mounted in a casing 69 of the selector mechanism hereinafter described. Each slide 68 is formed or provided with front and rear depending lugs 70 and 71, respectively, for a purpose hereinafter described.

Before describing the means which determines which one of the slides 68 shall be selected for reciprocation, we will describe the compound carriage mechanism through which power is transmitted to reciprocate the selected slide and its counter actuating bar 37. Referring to Figs. 4 and 20, the compound carriage consists of upper and lower members 72, 73, slidably mounted in uprights 74, each of said members having openings formed therein to reduce the weight thereof and to permit the passage through such opening of members of the resetting mechanism hereinafter described. The rear bar of the upper member 72 is formed or provided with a plurality of downwardly depending lugs 75 which are spaced uniformly in accordance with the lateral spacing of the actuating bars 37. The member 72, at its ends, is provided with outwardly projecting pins 77 which enter slots 78 in the lower ends of arms 79 secured to a rock-shaft 80. The purpose of the shaft 80 and its arms 79 connected as described to the member 72, is to equalize the reciprocating movements of said member 72, or in other words, to render it certain that both ends of said member will reciprocate in exact unison. The lower member 73 of the carriage has rearwardly extending arms 81, the rear ends of which arms have posts 82 connected by springs 83 with posts or lugs depending from the upper member 72 of the carriage. The compound carriage is reciprocated by mechanism presently described, the construction of this carriage in two parts as mentioned enabling the lower member to travel always a uniform distance while the upper member is so yieldingly connected to it through the springs 83 as to enable said upper member to be stopped at a point of its rearward movement determined by the control mechanism hereinafter described, or in other words, according to the amount of movement that is to be imparted to an actuating bar 37 to count a greater or lesser number. Secured to the upper face of the lower member 73 of the carriage is a strip 84 (Fig. 20) of suitable light material, such as wood, having a strip of felt 85 along its front face to serve as a buffer when the two members 72, 73 of the carriage, after having been spread from their normal relationship are returned to the positions shown in Fig. 20. The ends of the lower member 73 are provided with ears 86 (Fig. 4) which are connected by links 87 with arms 88 of a rock-shaft 89 mounted in bearings provided by the uprights 74, the construction being such that whenever the rock-shaft 89 is actuated by the power mechanism hereinafter described, said rock-shaft acts through the links 87 to impart a single reciprocation to the lower member 73 of the compound carriage, so that the latter, through the springs 83, imparts a yielding reciprocation to the upper member of the carriage.

A bar 90, which for convenience of description will be hereinafter referred to as the bail, is carried by two arms or levers 91 pivoted at 92 (Figs. 4 and 20) to the member 72 of the carriage, said arms 91 extending rearwardly above the ends of springs 93, which are attached to said member 72, the force of these springs being exerted upwardly under the rear ends of the arms 91 so as to yieldingly depress the bail 90 and hold the latter normally in position to contact with the upper end of any pivot pin 44, (Figs. 14 and 17) the pins 44 therefore serving as lugs to be engaged by the bail 90, whereby movements of the bail can be transmitted to the bars 37. The object of the yielding support for the bail 90 is to enable it to be raised above the plane of the tops of the lugs or abutments 44 during the resetting to zero, as hereinafter described. It should be explained at this point that the first motion which an actuating bar 37 has is a rearward one, and this is effected by the rearward motion of the carriage, one of the lugs 75 contacting with the front end of a slide 68, the rear end of the latter contacting with the pin 67 of the selected actuating bar 37, the return motion of said bar 37 toward the front of the machine, during which time rotation is imparted to the counter or indicating disk, being effected by the bail 90 acting upon the abutment 44, said bail being brought forward by the compound carriage, which in turn has motion imparted to it by the power mechanism which we will now proceed to describe, referring particularly to Figs. 1, 19 and 21.

A short shaft 94 is mounted in suitable bearings, said shaft having a crank pin 95 projecting from a disk secured to the inner end thereof, said pin being connected by a link $95^a$ to an arm 96 of rock-shaft 89. On the shaft 94 is mounted a clutch-driving mechanism, which is of the well known type known as the "Horton" clutch, which is adapted to impart but a single rotation to the shaft on which it is mounted. Said clutch includes a pulley 97 for a belt constantly driven by any suitable power. A clutch of the type mentioned operates to rotate the shaft once, when the clutch is released. As the said Horton clutch is well known, the details thereof and of its releasing devices, need not be described or illustrated herein. It is sufficient to say that its release is operated by a link 98 (Figs. 1, 19 and 21) connected to an arm 99 of a rock-shaft 100. The rock-shaft 100 has pinned thereto, or otherwise rigidly connected therewith, a series of arms 101, each having an upper lug 102 and a lower lug 103, (Fig. 20).

In Fig. 19 we illustrate only one arm 101, but it is to be understood that there is an arm 101 and a coacting group of mechanism hereinafter described, for each numeral key lever of the typewriting machine. A spring, such as a coiled spring 104, acts to return the shaft 100 to normal position after actuation, and to shift link 98 in the direction of the arrow in Figs. 19 and 21 to return the clutch-release mechanism to normal position.

Each group of mechanism includes a device 105 (Figs. 20 and 23) to be actuated by the downward movement of a numeral key lever 131 of the typewriting machine, and for convenience of description, said device is called a treadle. It comprises an arm pivoted at 106 to an irregular shaped lever 107 journaled on a transverse rod 108, said treadle-arm having its upper end suitably shaped to receive the impact of said numeral key lever. When the typewriting machine is in position relatively to the calculating machine, it is desirable that the former shall be capable of being used for ordinary typewriting and that the numeral key levers can be used without operating any of the parts of the calculating machine. We therefore provide means whereby the operator can quickly render the calculating machine inoperative, and we do this by shifting all of the treadles 105 to positions where they cannot be depressed by the numeral key levers 131, as indicated by full lines in Fig. 20, and dotted lines in Fig. 23. Each treadle arm 105 is connected by a link 109 with an arm 110 of a rock-shaft 111 which, at one end (Figs. 19 and 21) has a mutilated pinion 112. A disk 113 having teeth 114 is mounted on a suitable stud-shaft and has a handle disk or knob 115 whereby it may be turned to cause the teeth 114 to coöperate with the mutilated pinion 112 to oscillate the shaft 111 so that all of the treadles will be raised or lowered, as shown by comparing the full and dotted line positions in Figs. 20 and 23. The periphery of the disk 113, at either end of the series of teeth 114, coöperates with the concave surfaces of the mutilated pinion 112, to lock the said pinion, and the shaft 111 and the treadles, with the latter in raised or lowered positions. When lowered, they are below the lowermost positions to which the numeral key levers 131 can be moved, and therefore, the typewriting machine can be operated solely for any of its usual purposes. The disk 113 can be turned farther, for other purposes, as hereinafter explained. The knob 115 can be used to turn it for the purpose just described, but to enable it to be quickly turned just the right distance to effect the lowering of the treadles, we provide a finger lever 116 journaled on the stud-shaft of the disk 113, said finger lever engaging a pin 117 on the inner side of the disk. Normally the finger lever 116 occupies the position shown by full lines in Fig. 21, resting on a stop pin 118 projecting outwardly from the frame. When swung upwardly to the dotted line position which is determined by a stop pin 119 projecting from the frame, said finger lever acts on pin 117 of the disk 113 to turn the latter far enough to effect the lowering of the treadles, after which the finger lever preferably drops back to normal or idle position against the stop 118. While the finger lever can impart to the disk 113 only about one-fourth of a revolution, said disk, as above mentioned, can be rotated further to effect other results to be described. The limits of movement of the disk are prescribed by a short pin 120 projecting from the inner face of the disk (see dotted lines in Fig. 21) and adapted to contact with either of the fixed stop pins 118, 119.

In Fig. 14 the dotted line representation of one of the bars 52 indicates the position to which that bar is moved by the act of carrying from one counter to the other. It is essential, of course, that each of the bars 52 shall be returned or reset to the full line position. To effect this resetting we provide the following mechanism. Each pivot $54^c$ enters an eye 126 of a link 127 (Figs. 7, 14 and 20) and each of the links 127 is slotted at its rear end, as indicated at 128, the slots receiving pins 129 rising from the strip 84. Since said strip 84 reciprocates of course with the compound carriage, whenever the carriage approaches its rearward position, its pins 129, coacting with the rear ends of the slots 128 of links 127, will cause the links to reset any or all of the bars 52 that require resetting. The reason for the lost motion connection provided by the slots 128 is that the extent of movement of the reciprocating carriage is very much in excess of the amount of movement required to shift a bar 52 from the dotted line position shown in Fig. 14 to the normal or full line position.

As has been mentioned, the apparatus is designed to support a typewriting machine without any positive mechanical connection. Such support may be afforded by means of any suitable uprights connected with the base 30. Two of the posts or uprights for supporting the frame of the typewriting carriage are indicated at 130 in Figs. 1 and 2. In practice two more suitable supports or posts will be provided nearer the front of the base. The four supports will in practice be relatively arranged to receive the usual four feet of a typewriting machine. The said posts or supports are so positioned that when the typewriting machine is placed thereon the numeral key levers will occupy substantially the position shown at 131 in Fig. 20. A cross-bar 133 (Fig. 20) pivotally supports a series of stop levers 135, one for each group of mechanism actuated by a finger key lever 131, each of said stop levers being held normally in the position shown in Fig. 20 by a spring 136 connected to a finger 137 supported by a fixed cross-bar 132. Each stop lever has a heel 332 formed with a cam-face to be acted upon by either one of a series of ratchet cams hereinafter described.

The stop levers 135 coact with a notched cross plate 139 which is mounted in suitable guides of the upper member 72 of the carriage, so that said cross plate may be shifted in the direction of its length. One end of the cross plate is provided with a slot, as indicated in Fig. 35, said slot receiving a pin 140 carried by a lever 141 pivoted at 142 and actuated by mechanism hereinafter described to determine whether the machine shall be used for addition or subtraction, (Fig. 9).

To prevent rebounding or forward movement of the upper carriage member 72, owing to contact with the stop levers just described, and to lock it temporarily, as hereinafter described, we provide detent mechanism which is best illustrated in Figs. 35 and 36. Secured to the carriage member 72 at substantially the middle thereof, is a bar 145 having ratchet rack teeth along one side. An elbow lever 146 pivoted to a suitable upright or post has its long arm provided with a tooth 147 to coact with the rack 145. The end of said long arm presents a cam edge 148 to be acted upon by a pin 149 (rising from the lower carriage member 73) in opposition to a spring 150 connected to the short arm of the lever. A hook-shaped detent 151 for the tip of the short arm of the lever 146 is pivotally supported at 152 by a suitable post rising from the base, a coiled spring 153 acting to hold the detent in yielding contact with said tip of the short arm. An arm 154 of the detent has a pin 155 adapted to be engaged by the edge of the bail 90. When the compound carriage 72, 73, moves rearwardly, the rack 145 rides over the tooth 147 of the elbow lever, but the spring 150 of the latter is constantly acting so that when the notched cross plate 139 of the upper carriage member 72 is arrested by a stop lever 135, the tooth 147 instantly engages a tooth of the rack and prevents rebound of the carriage member 72. This also locks said carriage member until released again and then returned by the lower carriage member. Since the lower carriage member always moves rearwardly the same distance, when the pin 149 engages the cam edge 148 of the elbow lever, it oscillates said lever and permits the hook detent 151 to snap over the tip of the short arm and hold the elbow lever with its tooth 147 separated from the rack 145. Then as the lower carriage member moves toward the front of the machine, it picks up the upper carriage member and returns that also to normal position. As the bail 90 moves with the carriage member, the said bail, as it nears its normal position, engages the pin 155 of the detent and swings the latter so as to release the elbow lever and permit it to be returned to normal position by its spring 150, the tooth 147 then reëngaging the rack 145.

The cross plate 139 has a series of differently shaped notches or recesses 156, as shown in Fig. 35, for purposes hereinafter described.

It is essential, of course, that any of the slides 68 which may be accidentally moved in the direction of their length by any jarring action or friction of the carriage shall be accurately returned to proper position so that proper selection may take place. To effect this, the lower carriage member 73 is provided at its rear edge with an upwardly projecting rib 157 engaging behind the front lugs 70 of the slides 68. Inasmuch as the carriage member 73 always reciprocates a fixed distance, its rib 157, although free to move away from the lugs 70 toward the right in Fig. 20, must, when the carriage returns toward the front of the machine or the left in Fig. 20, return all slides 68 that may have been shifted toward the right, back to normal position.

We will now describe the selector mechanism in detail, referring to Figs. 1, 2, 4, 7, 20 and 35. The selector slides 68 are mounted, as has been explained, in a casing 63.

Said casing is in two sections, each of which is movable intermittently and laterally, independently of the other. To support these sections so that they may be shifted laterally of the machine we provide tracks or ways 163 (Fig. 20) mounted upon suitable supports such as posts 164 in order that space may be provided below the sectional casing for the actuating bars 37.

Strips 165 underneath the sectional casing have end lugs projecting under the tracks 163 to prevent the casing from rising, the said tracks, of course, also guiding the casing sections during their lateral adjustment by the mechanism hereinafter described. Rising from the base of the machine at substantially the mid-width thereof is a post or bracket 166, the sections of the casing being at opposite sides thereof. The two casings are connected together by a spring 167 having a tendency to draw both sections toward the opposite sides of the post 166. A lever 168 pivoted at 169 has a roll 170 at its front end entering the space between the two sections of the casing 69 behind the post 166. This lever is actuated by a mechanism hereinafter described so as to control the positions of the casing sections, as hereinafter described. The slides 68 are mounted in the casing sections with such relative spacing that only one of said slides at a time can be located behind or in the path of one of the lugs 75, said relative arrangement of the slides 68 constituting a Vernier-like arrangement for a purpose presently explained. As the carriage of the typewriting machine travels toward the left, the lever 168 is shifted step by step from the position shown in Fig. 4, by means of connections to be described; the first movement of the roll 170 toward the right will permit the spring 167 to cause the left-hand casing section to move toward the right to bring one of the slides 68 in position behind the first lug 75 at the left in Fig. 4, so that the rearward movement of the compound carriage will cause the said first slide 68 at the left to move rearwadly and slide the actuating bar 37 back to an extent determined by the control mechanism hereinbefore described. A further movement of the lever 168 will cause a shifting along of the left-hand casing 69 to bring the next slide 68 in line with the next lug 75, and so on. The first series of step movements of the lever 168 causes one traverse or sliding movement of the left-hand casing 69 under the tension of spring 167, until the roll 170 of the lever contacts with the inner end of the right-hand casing section 69, further step movements of the lever 168 then intermittently moving said right-hand section against the tension of spring 167, the left-hand casing section coming to rest against post 166. During this gradual step movement of the casing sections all of the Vernier-like positions of the slides 68 have brought each one of said slides successively into position to act as a temporary connection between the compound carriage and an actuating bar 37.

The reason for making the selector casing in two sections is because the amount of movement that would be required if made in one section or piece would cause the slides 68 to be shifted along to such positions that two of the slides might be brought to connecting positions simultaneously unless the slides 68 and lugs 75 were made prohibitively thin or narrow.

The lever 168 which shifts the selector sections has a pin 171 at its rear end which is engaged by mechanism including a coupler that is connected with a portion of the carriage of the typewriting machine during a portion of the travel of said carriage. For this latter purpose we provide a laterally shiftable frame comprising the bar 172 mounted to travel between upper and lower rolls 173 supported by brackets 174 rising from the base 30. Arms 175 rigidly connected to the bar 172 and extending rearwardly therefrom carry a plate 176 which travels between upper and lower rolls 177 carried by a bracket 178 rising from the base 30. Rigidly secured to and rising from one end of the bar 172 is an upright 179 which carries the coupler presently described. The chief purpose of the plate 176 is to guide the bar 172 so that the upright 179 will be held always in vertical position, while permitting it to be shifted laterally, or in the direction of movement of the typewriter carriage. To additionally support the upright 179 when it is shifted toward the left, we provide a roll 180 mounted to ride upon the base 30, or a lateral extension of the latter.

A further purpose of the plate 176 is to carry the latch mechanism which engages the lever 168, the mounting of the said latch mechanism on the said plate enabling us to provide a longer lever 168 than if such latch mechanism were to be carried by the bar 172.

Referring particularly to Figs. 10 and 11, the latter being an under plan view of the plate 176 and the latch mechanism, a lug 181 is fixedly secured to the plate 176 in position to contact with the left side of the pin 171 of lever 168. A latch 182 is pivoted at 183 and has a cam surface 184 adapted to contact with a fixed pin 185 rising from the base. The latch is normally held in the position shown in Figs. 10 and 11 by a spring 186. The free end of the latch is formed with a shoulder 187 and with a vertical lug 188 (Fig. 13).

Mounted in the upper end of the upright 179 is a rock-shaft 189 (Figs. 2, 8 and 9)

having a coupling member comprising an offset arm 190 extending tangentially to the rock-shaft, the said arm 190 being beveled or inclined similar to a latch. The shaft is formed with a key-way 191 which receives a pin projecting inwardly from a collar 192 having an arm 193, said collar being mounted in a slot or recess in the upright. The arm 193 is connected by a link 194 with a lever 195 pivoted at 196 to the base of the upright. A spring 197 engaging the under side of the arm 193 normally holds the rock-shaft and its latch or coupler arm 190 in normal position, such position being determined by a stop 198 projecting from the upright above the lever 195. Said lever 195 is formed with a cam surface 199 adapted to engage a fixed pin 200 projecting rearwardly from a side flange rising from the base (Figs. 2 and 8).

The frame of the carriage of a typewriting machine always has some portion which is adapted to have the coupler or latch arm 190 engage therewith, while an extreme end portion of the said typewriter carriage frame may contact with the inner end of the shaft 189 so that when the parts are coupled the upright will partake of movements of the typewriter carriage frame in both directions. In order that the distance of the upright from the typewriter carriage, when coupled, may be varied to enable numerals to be written in different lateral positions on the sheet of paper and at the same time have the calculation operations performed, the rock-shaft 189 may be adjusted longitudinally. For this purpose said shaft is formed with a plurality of annular grooves 201, either one of which may be engaged by the end of a locking slide 202 (Figs. 8 and 9) having a spring 203 acting to hold said slide with its upper end in one of said annular grooves. The slide is provided with a suitable finger piece 204 to enable it to be disengaged from the rock-shaft to permit the latter to be shifted longitudinally, the spring 203 then returning the lock slide to coact with another annular groove of said rock-shaft. This portion of the machine operates as follows: At the beginning of use of the machine the upright will occupy the position shown in Figs. 4 and 8, which is its extreme right-hand position, the carriage of the typewriting machine being separated from the coupler and occupying the position which it would have when beginning the writing of a line. The typewriting machine may be used for writing words, such as quantities and character of goods for which a bill is being made out, the parts being adjusted so that when the portion of the bill sheet which is to have the amounts written thereupon has reached a proper position to be filled in, the left-hand end of the typewriter carriage frame rides over the beveled surface of the coupler arm 190 and contacts with the end of shaft 189, said arm 190 then springing up behind that portion of the frame of the typewriter carriage. To facilitate an understanding of this operation a portion of the frame of the typewriter carriage which would be so engaged is indicated in cross section at *a* in Fig. 8. The spring which causes the typewriter carriage to travel then pushes the upright toward the left and, of course, causes the bar 172 and plate 176 to travel toward the left. At this time the shoulder 187 (Figs. 10 and 11) is engaged with the right-hand side of pin 171 of the lever 168 so that during step movements of the typewriter carriage and of the upright 179, the lever 168 is caused to impart step movements to the selector mechanism already described. These step movements continue until the cam 184 reaches the fixed pin 185, causing the latch 182 to swing and release the pin 171 of lever 168 so that the typewriter carriage can continue to move toward the left, if desired, without producing any further effect upon the selector mechanism. At the moment of separation of the latch from the selector lever 168 just described, the latter is in the position shown in Fig. 10. To hold it in this position until the typewriter carriage is shifted manually to the right, we provide a detent mechanism illustrated chiefly in Figs. 8, 10, 12 and 13. A block 205 secured to the base 30 has an arm 206 pivoted to it at 207. The arm 206 has secured to it one end of a spring detent 208, the free end of which curves upwardly, as shown in Fig. 12, to normally occupy a position in the path of movement of a small stop pin 209 extending downwardly from the lever 168. The arm 206 also has secured to it a spring arm 210 having a lug 211 at its free end, said lug having a beveled face 212. The arm 206 with its spring detent and spring arm is normally held in the position shown in Fig. 10, against stop pin 213, by a spring 214.

As the lever 168 is being shifted as heretofore described, to the position shown in Fig. 10, its stop pin 209 rides along the upwardly curved end of spring 208 and depresses the latter and snaps behind it to the position shown in Fig. 12, said spring 208 being strong enough to hold the lever 168 in that position against the pull of spring 167 (Fig. 4), the right-hand section of the selector casing being then, of course, held over to the right, the left-hand section of said casing being then in contact with the post 166. This is while the typewriter carriage and the upright 179 are over to the left. When the typewriter carriage is returned toward the right by the operator, the upright 179 is caused to follow that movement, and during such following movement the cam 184 reaches the pin 185 so that the latch 182 is momentarily swung aside on its pivot so as to permit the lug 188 to take a position behind the side of lug 211. At this moment the cam 184 passes the pin 185 so that the spring 186 of the latch will swing the latch and cause its lug 188 to swing the spring arm 210 and with it swing its supporting block and the spring detent 208 so that the tip of the latter is shifted away from its position to oppose movement of the lever 168. When the latch 182 returns to normal position as just described, the shoulder 187 reëngages the right-hand side of pin 171. During further movement of the typewriter carriage and the upright toward the right, the lug 181 of the latch, by its engagement with the pin 171 of lever 168, swings the latter so as to result in the selector casing sections being shifted back to the position shown in Fig. 4. The object of the inclined or beveled face 212 of the spring arm 210 is to enable the lug 188, when passing from the right toward the left, to ride over said inclined face, depressing said spring arm in doing so, the latter then returning to normal position after the lug 188 has passed.

In order that the upright and its supporting carriage may be held in its extreme right-hand position shown in Fig. 4, without liability of being jarred or otherwise displaced after the typewriter carriage has left it, we provide a detent comprising a roll 215 carried by an arm 216 pivoted to the base and held by a spring 217 in a notch or keeper 218 formed in the inner edge of the plate 176.

It is desirable to positively prevent the typewriter carriage from being stepped along during the time that calculating operations are being performed until the moment of the completion of each calculating operation. To effect this we form or provide the bar 172 (Fig. 19) with a ratchet rack 219 with which a pawl 220 coacts. Said pawl is carried by a pivoted plate 221 which will be more fully described hereinafter. At present it is only necessary to explain that the pawl 220 is separated from the rack by means of a link 222 which is connected to the plate 221, the other end of the link being connected with one of the arms 88 (Figs. 19 and 25) of shaft 89. The connection with the arm 88 is by means of a pin 223 engaging a slot in the link to permit of lost motion so that only during the latter portion of the motion of arm 88 toward the left in Fig. 25 will the pawl 220 be disengaged from the ratchet rack. It will now be understood that since the arms 88 of rock-shaft 89 only reach the position shown in Fig. 25 at the completion of each calculating operation, as already described, at all other positions of said arms 88 the pin 223 occupies a position in the slot of link 222 which permits the spring of pawl 220 to keep it in engagement with the ratchet rack 219.

All of the locking bars or levers 52 which have been released and oscillated for carrying must be returned to their normal original position for resetting to zero. We will now proceed to describe the mechanism illustrated for obtaining this result. Mounted in side members of the frame is a shaft 224 having as many pins 225 projecting therefrom as there are bars 52 (Figs. 14, 17 and 29). Each pin 225 is adapted to contact with the upper end of a pivot pin or screw 56 so that when said shaft 224 is rocked all of its pins will engage the pivots 56 of those bars 52 which have been shifted out of normal position and oscillate said bars to positions so that the notches 60 of the arms 55 will engage the fixed pins 59 hereinbefore described, and lock all of the bars 52 in alinement in the position shown in Fig. 14. The mechanism for actuating the shaft 224 and its pins will be presently described.

We will now describe the mechanism whereby all the counters or indicators may be set to zero in order to prepare the machine for a new piece of work.

Referring to Figs. 19 and 29 to 34, and first especially to Figs. 29 and 31, a block or plate 226 is secured to the outer face of the left-hand frame upright 74, said plate rotatively supporting the combined knob or handle 227, and disk having a cam groove 228, and an actuating disk having a short series of teeth 229. Also rotatively supported by the plate 226 are three mutilated pinions 230, 231, 232, adapted to be successively actuated by the teeth 229, each of said pinions having concave peripheral portions at each end of its series of teeth, so that untoothed portions of the periphery of the actuating disk coacting therewith will hold it locked after the teeth 229 have passed its teeth. The hub or shaft of pinion 230 has an arm 233 connected by a link 234 with an arm 235 of a rock-shaft 236, the latter having one or more other arms 237 to swing under and engage the bail 90 at suitable longitudinal positions thereof, to lift the bail above the plane of the tops of the pivot pins 44 (Fig. 17). The arm 235 is connected by a link 238 with an arm 239 of shaft 224 which has the pins 225 hereinbefore described for re-setting the carrying mechanism.

The hub or shaft of pinion 231 has an arm 240 connected by a link 241 with an arm 242 of a rock-shaft 243, the connection of the link with said arm 242 being a lost motion one. The shaft 243 extends across the machine and has a series of forked arms 244

(Fig. 30) adapted to engage pins 245 projecting laterally from the actuating bars 37. To bring about this engagement, the shaft 243 is shifted longitudinally by means of a lever 246 pivoted to the base at 247 (Figs. 29 and 32) and having a stud 248 embracing the shaft 243 between the arm 242 and a collar 249 secured to the shaft. The other end of lever 246 has a pin 250 (Figs. 29 and 31) entering the cam groove 228 so that when the handle 227 is turned to cause the cam groove to oscillate the lever 246, the shaft 243 is shifted longitudinally to cause the forked arms 244 to engage the pins 245 of the actuating bars, or separate therefrom.

The hub or shaft of the pinion 232 has an arm 251 connected by a link 252 with an arm 253 of a rock-shaft 254 having a series of pins 255 all in one row, which pins, when the shaft 254 is rocked anti-clockwise, move down across the left-hand sides of the arms 55 (Fig. 14) to prevent said arms from being swung out of the positions shown in that figure.

As shown by comparing Figs. 29, 33 and 34, the spindles 32 of the indicators are provided with small friction hubs 256 adapted to be engaged by friction strips 257 carried by a slide bar 258 suitably mounted in the machine and having a handle 259 at one end, a spring 260 being connected to the other end to draw the bar to the left against a suitable stop. The strips 257 are staggered (Fig. 34) so that each one can engage but one friction hub. The said strips are so positioned and are of such length, that when in normal position, the end of each one will be slightly away from the hub 256 that is to be engaged thereby when the bar is slid toward the right.

After the completion of a piece of work, the counters are set back to zero by the operator simply turning or rotating the handle 227 and the members compounded therewith, as far as permitted by a stop, such as a fixed pin 261 (Fig. 29) coacting with suitable portions of the grooved disk, such movement of the handle being in the direction of the arrow in Fig. 29. The teeth 229 first engage the pinion 230 and partially rotate it (holding it then locked as hereinbefore described) and, through the connections described, cause the pins 225 to act on the pins 56 of any bars 52 that are out of alinement, to swing all such bars into alinement. All the bars 52 are then held so that there can be no carrying effected during later operations now to be described. This same movement of the pinion 230 lifts the bail 90. The acting portion of cam groove 228 is so located that at this same time the shaft 243 (Fig. 30) is shifted to engage the forked arms 244 with the pins of bars 37 so that later rocking of shaft 243 will slide all of said bars. At this point it is to be understood that the amount of movement that can be imparted by the rock-shaft to the bars 37 is only such as to actuate the counter disks one-tenth of a revolution. Further rotation of handle 227 causes the teeth 229 to actuate pinion 231 so as to rock the shaft 243 and slide all the bars 37 back a distance that will, when said bars later move forward, result in the counters being advanced one digit. The last rotative movement of the handle 227 causes the teeth 229 to actuate pinion 232, to cause the pins 255 of shaft 254 to obstruct movement of the arms 55, as above explained. The operator then, by handle 259 (Fig. 34) slides the bar 258 to the right. The friction strips then engage the friction hubs 256 of the spindles and rotate all spindles that are free, until their radial teeth 63 (Fig. 14) contact with the tips of arms 55. The teeth 63 so project from the spindles, relatively to the numerals of disks 31, that when said teeth 63 are in contact with the arms 55, the numerals 9 show through sight openings in a cover plate over the disks. Obviously, this will result in every counter disk showing a "9." The spring 260 returns the bar 258 to the left, but the friction devices cannot cause any spindles to rotate backwardly because of the detents engaging the ratchet pinions. The operator then turns the handle 227 to return all of the parts just described to normal positions, during which return movements the shaft 243 is rocked so that its forked arms slide the actuating bars 37 forward. As explained, the extent of movement of the bars 37 so effected, is such as to rotate the spindles the distance of one digit. Therefore this shifts the indicator disks to show only ciphers through the sight openings, and therefore the disks are reset to zero. It is to be understood, of course that during these return movements, the pins 255 leave the sides of the arms 55 in time to enable the radial teeth 63 to push the arms 55 laterally when the actuating slides 37 are imparting the final zero-setting movements to the ratchet pinions and the indicators. Of course, the springs 57 instantly restore the arms 55 to the positions shown in Fig. 14.

We will now describe the tabulating devices which enable the operator to quickly determine the position of the typewriter carriage according to the first numeral that is to be written and tabulated. It may be stated here that with a machine organized as illustrated, the number of counters provide for adding up to within a cent of ten billions, the position for the carriage when a numeral is to be written in the billion column being at the extreme left.

Referring to Fig. 4, the sliding selector rod 172 is provided with a suitable projection, such as a collar [illegible], which collar is adapted to abut against the side of the arm [illegible]

end of one of a plurality of slides 281 as the said rod 172 moves toward the left, the stoppage thus effected determining the position of the typewriter carriage. There are 12 of the slides 281 mounted in a suitable frame indicated at 282 in Fig. 5. Each slide is provided at its forward end with a lug 283 which coacts with the frame to form a stop to limit the rearward movement of the slide. Each slide has at its front end a tripping lug 284 to coact with a tappet arm 285 depending from and secured to a rock-shaft 286. There are as many tappet arms 285 as there are slides 281. The rock-shaft 286 has secured to it a rearwardly projecting tripping arm 287 in position to operate the usual carriage release mechanism employed in typewriting machines having tabulating devices, such mechanism usually having a rock-shaft provided with an arm. It is such an arm of the usual tabulating mechanism of the typewriting machine that is to be lifted by the arm 287 illustrated in Fig. 5. Such arm of the usual tabulating mechanism of an ordinary typewriting machine is indicated at *b* in Fig. 5.

Extending transversely of the machine, as illustrated in Fig. 4, and above the slides 281, we provide a suitably mounted series of rock-shafts 288, each having an arm 289 forked at its lower end and engaging a pin 290 of a slide 281. There are as many rock-shafts 288 as there are slides 281. Each rock-shaft 288 has also another arm 291 (Figs. 4 and 6), said arm 291 having pivotally connected to its lower end the rear end of a push rod 292 extending to the front of the machine and having a finger-piece 293, a spring 294 being employed to hold the push rod normally forward. When the operator wishes to start the calculating with any particular counter, the proper finger-piece 293 is pushed inwardly so that, through the connections described, the proper slide 281 has its rear end projected into the path of movement of the collar or projection 280 of the rod 172. Incidentally, this movement, owing to the rock-shaft 286, arm 287 and the tabulator arm *b* shown in Fig. 5, would release the carriage of the typewriting machine and permit it to be stepped by its spring.

We will now describe the mechanism which enables the machine to be used for subtraction. As has been explained, the longitudinally shiftable cross-plate 139 has notches 156. These notches are irregularly shaped, as shown in Fig. 35. Each notch is so formed that its bottom presents either two or three shoulders or stop portions to coact with the end of a stop lever 135 when the latter is lowered to the full line position (Fig. 26), to arrest rearward movement of the cross-plate and the top member 72 of the carriage. Some of the notches have their bottoms presenting only two shoulders, and the rear edge of the cross-plate adjacent such notches presents the equivalent of the third shoulder. It is obvious that the upper member 72 of the compound carriage will be permitted to move rearwardly a greater or lesser extent according to which portions of the notched rear edge of the cross-plate 139 are opposite the ends of the stop levers 135. The reason for this shaping of the rear edge of the cross-plate 139 will be presently explained.

The mechanism for controlling the position of the lever 141, and the notched cross-plate 139 is best illustrated in Figs. 2 and 3. The lever 141 is normally held for addition in the position shown in Fig. 2, against a stop pin 296, by a spring 295. The front end of the lever 141 is connected to a slide 297 by devices presently described. The slide 297 is mounted in a suitable slideway transverse of the machine near the front thereof, and has a series of notches 298 in its upper edge. Pivotally mounted below the slide 297 are upright stops 299, the pivotal connections being of a friction type that will hold said stops upright until they are positively swung aside. Each stop 299 has a pin 300 extending through the notches 298 of the slide and into notches 301 in fixed cross-bar 302 so that the amount of swing that can be imparted to the pivoted stops will be limited by the width of the notches 301.

There is a well known method of subtraction by means of addition, and it will not be necessary to herein refer to said method further than to state that it requires the addition of a 1 to the right-hand column, the prevention of carrying beyond the higher value enumerated, and the reversal of the order of the digits; for instance, if a 6 is to be subtracted, 3 is added, and if a 5 is to be subtracted, 4 is added, and if a 9 is to be subtracted, there shall be an actuation of a lever which will do no adding, but which will actuate the mechanism to print a "9." This method provides for the addition of the complement of 9 (the difference between 9 and the real amount to be subtracted) and the prevention of carrying as stated. The operator can select either one of the pivoted stops 299 and throw it over to the dotted line position indicated in Fig. 3, so that the lower end of said pivoted stop will pass in front of the left-hand end of the bar 52 that is at the right thereof, so that said bar 52 cannot be moved to the dotted line position indicated in Fig. 14. This, owing to the mechanism illustrated in said Fig. 14 and hereinbefore described, will prevent carrying beyond that point. When the operator so swings a pivoted stop the pin 300 thereof shifts the slide 297, and through lever 141 shifts the notched plate 139 (Figs. 26 and 36), so that other stop portions of its notched edge will be opposite the ends of stop levers 135 of the several groups of mechanism. The different notches of the cross-plate are so formed relatively to each other that when the plate is so shifted, the amount of movement that can be imparted to the carriage member 72, instead of being according to the numeral borne by the numeral key lever, will be the complement of that numeral according to the method of subtraction by means of addition just described.

It should be explained here that when the operator shifts pivoted stop 299 as just described, it is essential that the slide and the lever 141 and the plate 139 shall be locked against the action of spring 295 as long as subtraction is to be continued. To effect this, we provide the slide with a pin 303 (Fig. 8) which is adapted to be engaged by the shoulder 304 of a detent 305 pivoted at 306 and normally pressed upwardly by a spring 307. In Fig. 8 the parts are in the relative positions which they occupy when addition is to be performed. When subtraction is to be effected by the method described, the pin 303 is moved to the left from the position shown in Fig. 8, the spring 307 then throwing the detent 305 up so that its shoulder will engage and lock said pin.

As shown in Figs. 2 and 8, the front end of the lever 141 has pivoted thereto a finger-piece 308 having a downwardly projecting lug 309 adapted to bear upon the detent 305. The front end of the lever is forked, as at 310, to engage opposite sides of a lug 311 projecting upwardly from the slide 297. After the slide 297 has been shifted as hereinbefore described, to provide for subtraction by the complement of 9, the present mechanism provides for a further operation presently described, which requires a further shifting of the slide 297 toward the left in Fig. 8. When this is to be done the operator presses against the finger-piece 308 toward the left in Fig. 8, so as to impart a further movement of the lever 141 in the direction of the arrow in Fig. 8, so as to shift the plate 139 to bring the extreme left-hand portions of the notches 156 (Fig. 36) opposite the stop levers 135. As presently explained, this is done only for the depression of one numeral key lever. The operator retains hold of the finger-piece 308 until such numeral key lever has been operated, and then as soon as pressure against the finger-piece 308 is reduced, the spring 295 returns the lever 141 so that the slide 297 will move toward the right again, while the lug 309 is still bearing upon the detent 305 with sufficient pressure to hold the latter down to permit the pin 303 to return to the position shown in Fig. 8.

As has been explained, the relationship of the notches 156 of cross-plate 139 is such as to permit movements of the upper member 72 of the carriage for operating the indicators according to the numerals of the numeral key levers when addition is to be effected, but according to the complement of these numerals when subtraction is to be effected, the relationship being according to the complement of 9. The left-hand portions of the notches 156 are such as to provide for the movement of the compound carriage according to the complement of 10 instead of the complement of 9. For instance, if the numeral key lever 131 bearing the character "3" were to be depressed, the amount that would be added would be 7 instead of 3, and if a numeral key lever 131 bearing the character "6" were to be depressed, the amount of addition would be 4 instead of 6. With this explanation it will be understood that when the finger-piece 308 is operated so as to act through the lever 141 to shift the notched plate 139 to the extreme right, then the depression of any numeral key will result in the addition of a number the complement of 10 of the numeral borne by that key lever. Therefore, when the operator is effecting subtraction by means of addition, he will first adjust the parts to effect the result by means of the complement of 9 until he comes to the last of the numerals that is to be subtracted, and before performing that last operation he will shift the parts so as to subtract by adding the complement of 10 instead of the complement of 9, the result being that it adds simply one more than would be effected when adding by the complement of 9. That last operation might be to typewrite and subtract either in the cents column or in any other column.

In order that there may be no liability of the actuating bars 37 being jarred or otherwise reciprocated out of normal position, each of said bars is provided with a recess 312 (Fig. 1) adapted to be engaged by a roll carried by a spring-pressed arm 313.

As shown in Fig. 4, the lugs 75 of the carriage are uniformly or equally spaced apart, but the slides 38, the ends of which are engaged by said lugs, are not uniformly spaced as to each other, nor are any two of them spaced the same as the lugs 75. The reason for this is to prevent the actuation of any counter when the casing 69 (or either of its two parts) is in position that must provide for the decimal point or for the division which is customarily made by means of the commas when the amount is greater than 999.99. As has been explained, the casing 69 is shifted step by step in unison with the carriage of the typewriting machine or ployed to control the calculating machine. Therefore, the relative spacing of the slides 68 is such that no slide will be in line with a lug 75 when the decimal point or a comma is to be written.

When a typewriting machine of the key lever type such as the "L. C Smith," "Underwood," or "Remington," is placed upon the supports 130, the key levers for writing the numerals 1 to 0 are directly above the treadles 105, and so long as the treadles are in the upright position shown by full lines in Fig. 23, the actuation of any numeral key lever 131 will depress the treadle 105 below it and, through the mechanism now to be described, operate the counting devices. This structure is such that no changes or special features whatever are introduced into the typewriting machine, and no time is wasted, nor special care required, in bringing about the proper operative relationship between the typewriting and the calculating mechanisms.

In Fig. 19, we illustrate but one treadle 105 and group of mechanism connected therewith and operated thereby, but it is to be understood that the complete machine has one such treadle and group of mechanism for each key lever of the typewriting machine that is used for controlling operations of the calculating machine.

The pivot 106 which connects the treadle 105 with its supporting or carrying lever 107 extends into a fork 314 of a pawl-carrier 315 loosely mounted on a transverse rod 316 (Figs. 19, 20, 23, 26). When a numeral key lever 131 depresses the treadle, it oscillates the pawl-carrier in one direction and the return movements are effected by a spring 317 connected to a fixed transverse rod 318 and to a lug 319 of the lever 107 which carries the treadle. The oscillating carrier 315 supports the pivot 320 of a pawl 321, a spring 322 acting to press the tip of said pawl inwardly to coact with a four-toothed ratchet cam 323 (Fig. 26) rotatable on rod 316. Pinned to the side of the member 323 is an eight-toothed ratchet 324 (Fig. 20). Projecting from the side of ratchet 324 are four long pins 325 and four alternating short pins 326. The hub 327 (Fig. 19) of the pawl-carrier carries a double tappet 328, 329, (Figs. 23 and 25).

Whenever the pawl 321 acts upon a shoulder 330 of the member 323 (Fig. 26) to advance the latter, a cam surface 331 of another portion of said member 323 acts upon the heel 332 of a stop arm 135 to swing the latter down to coact with the edge of cross-plate 139, in the manner hereinbefore described. The stop arm 135, when idle, occupies the position shown in Fig. 23, and by dotted lines in Fig. 26, the heel 332 resting between a ratchet shoulder 330 and a cam edge 331, said arm 135 being held in this position by its spring 136. The oscillating pawl shifts the member 323 far enough so that when the pawl retreats, the heel of the stop arm remains bearing on the smooth portion of the member 323 (Fig. 26) and said stop arm remains in operative position until the member 323 is rotated farther, by the power as presently described, to bring the next recess of said member 323 under the heel 332. The spring 136, although a light one, acts on the stop arm with sufficient strength to cause the heel 332 to act to prevent over-motion of the member 323. The first movement of the member 323 also moves the ratchet 324 so that a short pin 326 of the latter acts on lower lug 103 of arm 101 of shaft 100 (Fig. 20) to rock the latter and cause its arm 99 (Fig. 21) to act through link 98 to release the power-control clutch, as hereinbefore described. Then the clutch device permits the crank 95 (Fig. 19) to rotate once, thus, through link 95ª, arm 96 of shaft 89 (Fig. 21), arms 88 and links 87 imparting the movements to the lower carriage member 73 hereinbefore described. The next step movement of the members 323, 324, is effected by the power. To this end, we provide a swinging frame comprising upper and lower rods or bars 333, 334 (Figs. 20, 23 and 25) fixedly mounted in arms 335 pivoted at their lower ends as at 336. This frame is swung by a link connection 337 with one or both of the power-operated arms 89. Mounted freely on the upper rod 333 is a short sleeve 338 (Fig. 19) having at one end an arm 339 bearing on the upper tappet 328, and having at its outer end a push-pawl 340 (Fig. 20) provided with a tooth to engage the ratchet 324. Mounted freely on the lower swinging frame rod 334 is a short sleeve 341 having at one end an arm 342 (Fig. 25) to coact with the lower tappet 329, and having at its other end, a pawl 343 (Fig. 20) to also engage ratchet 324. The upper and lower pawls have extensions between which is an expansion spring 344 to act to hold the pair of pawls toward the ratchet and the arms 339, 342, toward the double tappet. After the depression of a key lever 131 has given the first step rotation to the ratchet, as described, and released the power-controlling clutch, the backward movement of the carriage-actuating arms 89 swings the frame rods 333, 334 rearwardly. Just before this, however, the pawls 340, 343 are permitted to engage the ratchet 324, under the action of their spring 344, because the double tappet 328, 329 which has been acting on the arms 339, 342 to hold the pawls spread, or away from the ratchet, has been swung by the operation of the treadle 105 far enough to release the arms 339, 342, and let the pawls engage the eight-toothed ratchet 324.

Then the backward movement of the frame rock 330, 334, causes the under pawl 343 to act on ratchet 324 to render it certain that said ratchet will be in relative position to be properly acted upon by the upper or push-pawl 340 when the frame next swings forward so that said pawl 340 will complete the movement of the two ratchets and bring them to normal position. The object of the double tappet and the arms which coact therewith is to prevent the swinging frame from actuating the mechanism of any but the one group that is being used by the operator. This result is obtained because the double tappet is only shifted out of pawl-restraining position by the manual depression of a key lever 181.

We will now describe the mechanism whereby, when one key lever 181 has actuated one treadle 108, that one will be locked down, and the treadles of all of the other groups of mechanism will be locked up, so that no second operation can be started until the power mechanism has effected a completion of the cycle of movements of the parts of the group first acted upon, and, of course, effected the actuation of the selected counter or indicator to the complete extent determined by which group has been acted upon. As has been stated, the downward movement of a treadle causes the shaft 100 to rock. Said shaft, at one end, has a tappet arm 345 (Figs. 26 and 27) adapted to coact with an arm 346 of a rock-shaft 347, said shaft having a series of locks 348, one for each fork 314 of a pawl-carrier 316. Normally there is a slight space between the arms 345, 346, as indicated in Fig. 26, to permit the fork 314 to pass its lock 348 before said lock is swung in to the position shown in Fig. 26. Normally the locks 348 all stand as shown by dotted lines in Fig. 26. When a treadle is depressed and the pawl-carrier of that group moves to the full line position of Fig. 26, the lock 348 for that group locks over the top of fork 314 and all of the other locks engage under the forks of all of the other groups, the normal positions of which are indicated by dotted lines in said Fig. 26. Thus all pawl-carriers 316 are locked until the rock-shaft 347 and the locks are returned to normal position, such return being effected by a spring 349 (Fig. 31) connected to an arm 327 of said shaft 347.

After the rock-shaft 347 has been actuated to carry the locks 348 to the position shown in Fig. 26, it is necessary that said shaft shall be locked or held in this position until the cycle of movements of [illegible] the calculating mechanism has been completed. To this end the arm 346 of the shaft 347 is provided with an extension in [illegible] toe 351 (Figs. 25, 26, and 27). Coacting with said toe 351 are two pawls 352, 353, (see also Fig. 30), both pivoted at 354. A spring 355 acts on a projection of the pawl 352 to hold the hook-shaped upper end of said pawl in the position indicated in Fig. 27.

A spring 356 acts upon pawl 353 to hold its hooked-shaped upper end as also indicated in said Fig. 27. The pawl 352 has a pin 357 projecting from one side. Said pin 357 enters an aperture in an arm 358 pendant from a pivot pin 359 (Fig. 25). When the arm 346 of rock-shaft 347 is first actuated from the position shown in Fig. 25, to the position shown in Fig. 27, the toe 351 passes below the engaging upper ends of the two pawls and is held in the position shown in Fig. 27 by the pawl 352, and remains in this position until the pendant pivoted arm 358 is actuated by the movement of the carriage, as hereinafter described. At this time the pawl 353 is performing no function, but it is in position to arrest the toe 351 when said toe is released by the pawl 352. The lower end of the pawl 353 extends in front of a pin 360 rising from an arm 361 extending rearwardly from the carriage, as indicated in Fig. 35, in connection with Fig. 25, so that when the carriage is actuated toward the front of the machine by the power mechanism, and just as the said carriage is reaching its normal position at the end of the cycle of movements, the upright pin 360 engages the pawl 353 and shifts it to position to release the arm 346 of the lock-carrying shaft. Before this occurs, however, the pawl 352 has been actuated to release the arm 346. This actuation of the pawl 352 is effected by the pendant arm 358, said arm in turn having been swung to shift the pawl 352 by the contact with the lower end of said arm 358 of a pin 362 (Fig. 25) projecting from one of the links 87. As shown in Fig. 27, the pawl 352 holds the arm 346 in a lower position than the position which would be retained by the pawl 353. It will now be understood that when the carriage moves rearwardly the pin 362, engaging the arm 358, causes the pawl 352 to release the arm 346 of the lock-carrying shaft 347, so that the spring 349 will actuate said shaft slightly until the toe 351 is arrested by the pawl 353. The locks of the shaft 347 then remain until the pawl 353 is released by the final forward movement of the carriage, as hereinbefore described. The slight upper movement of the arm 346 resulting from its release by the pawl 352, as just described, is not sufficient to permit the locks of shaft 347 to move out of engagement with the pawl carriers. The object of this double arrangement of pawls, one being shorter than the other, is to render it certain that the pawl 352 cannot get back into engaging position after it has once been released by the swing of pendant arm 358. It cannot get back into engaging position because, when the tip of the toe 351 has been released by pawl 352 and is engaged by pawl 353, said tip of the toe 351 is opposite the front face of the pawl 352, or the engaging shoulder, or both thereof.

To prevent any step movement of the carriage of the typewriting machine, until the completion of the cycle of movements for actuating the counters, we provide the following mechanism: The pawl 220 and plate 221 hereinbefore referred to, are pivotally supported upon a post 363 (Figs. 19 and 24), a spring 364 being coiled about said post and connected to the base at one end, and connected to the plate 221 at the other end, said spring having a tendency to swing said plate in the direction of the arrow in Fig. 19. The pawl 220 has a tooth adapted to engage between the teeth of the rack 219 carried by the rod or bar 172, which, as hereinbefore described, is connected to travel with the carriage of the typewriting machine when the latter is in lateral position for typewriting the columns of figures to be added or subtracted. Of course, when the pawl 220 is in engagement with the rack 219, the rod 172 and the typewriter carriage cannot move.

We will now describe the mechanism which will insure the pawl 220 being in engagement with the rack to operate the typewriter carriage during the time that the calculating mechanism is operated.

It will be understood, of course, that since the lateral position of the typewriter carriage controls the selector mechanism through the lever 168, any lateral shifting of the typewriter carriage during the operation of the calculating mechanism would cause inaccurate results, because such shifting would change the position of the selector mechanism. The pawl 220 is actuated toward the rack by the spring 365, and said pawl has a shoulder 366 with which a catch 367 coöperates, as presently described. The catch 367 is pivoted at 368 to the plate 221, and is normally held in the position shown in Fig. 19 by a spring 369. The catch has an arm 370 in the path of movement of a releasing lug or arm 371 carried by a small sliding rod 372 supported at one end in a guideway 373, the other end of the rod 372 being connected with an arm 374 of the shaft 100, so that whenever the shaft 100 is oscillated, due to the depression of a treadle 105, the arm 374 of said shaft causes the slide rod 372 to move in a direction so that the lug or arm 371 will act upon the arm of the catch 367 to swing the latter and release the pawl 220, whereupon, said pawl immediately enters between the two of the teeth of the rack 219 and locks the typewriter carriage, as hereinbefore explained. The rock-shaft 100 immediately returns to normal position so that the releasing lug 371 retreats from the catch. Therefore, when the carriage of the calculating machine is just about to complete its return movement, after the completion of the counting or indication, the link 222 swings the plate 221 back to the position shown in Fig. 19, during which movement the catch 367 reëngages the shoulder 366 of the pawl so as to withdraw said pawl from the rack 219 to permit the usual carriage-feeding mechanism of the typewriting machine to impart the usual step movement to said carriage.

We have already described how the actuation of the knob or handle 115 (Fig. 19) in one direction, will lower all of the treadles 105 to position so that the calculating mechanism will not be operated by the finger key levers of the typewriting machine.

We will now describe how rotation of the same knob or handle 115 in the reverse direction will restore the shifted parts to proper positions for operation. Of course, the return movement of the knob or handle will throw the treadles 105 back to their upright position, by the reverse movements of the connections with said treadles. But before the treadles are returned to their upper positions, certain other operations are effected. Mounted to slide in suitable ways on the frame are two racks 375 (Figs. 19, 20 and 21), connected by a transverse bar 376. The racks 375 mesh with toothed segments 377 secured to a shaft 378. One of the segments is acted upon by a spring 379, said spring being so connected that its tendency is to hold the bar 376 in the position shown in Fig. 20, and to return said bar to that position after it has been shifted away, as presently described. Since this bar is allowed to return suddenly to its normal position under the influence of said spring, we preferably provide suitable buffer material 380 backed by lugs or plates 381 secured to the frame. In order that the bar 376 may be shifted toward the front of the machine, or toward the left in Fig. 20, for the purposes hereinafter described, the shaft 378 is provided with an arm 382 having a pin 383, (Fig. 21). A mutilated pinion 384 mounted on a stud shaft below the pinion 112, has an arm 385, to which is connected one end of a long link 386 for operating the electric switch hereinafter described (Figs. 21 and 22). To the arm 385 is also pivotally connected one end of a slide rod 387, the rear end of said rod being slidably supported in a suitable upright 388 to constitute a guide for said rod. A latch 389, to connect the rod 387 with the pin 383, is pivoted to the rod 387 at 390. Said latch is formed with a substantially horizontal shoulder 391, and with a substantially vertical shoulder 392, the other or tip end of the latch being formed with a shoulder 393 and a projecting tongue 394. A spring 395 suitably connected to the rod 387, bears upon the shoulder 391 of the latch. A fixed pin 396 projecting from the side of the frame, is so located that when the parts are in the position shown in Fig. 21, which is the normal position of the machine for operation, the shoulder 392 of the latch, by bearing against the pin 396, holds the latch in the lower position illustrated in Fig. 21. When the knob or handle 115 is rotated in the direction of the arrow (Fig. 21), the teeth 114 first act upon the pinion 112, as hereinbefore described, and then further movement in the same direction results in the pinion 384 being actuated so that the slide 387 is shifted to the left, or toward the front of the machine. Since the latch 390 is carried by the slide 387, said latch, as soon as it leaves the fixed or stop pin 396, is shifted by the spring 395 so that the upper edge of the long arm of the latch slides under the pin 388. The extent of motion imparted as described, is such that the shoulder 393 of the latch just passes the pin 388 and snaps up in front of it, to the limit prescribed by the tongue 394. Then when the knob or handle 115 is moved from normal position, the teeth 114, engaging the pinion 384, reciprocate the slide 387 toward the rear of the machine, so that the shoulder 393 of the latch, owing to its engagement with the pin 388, causes the shaft 378 to be rotated in the direction of the arrow (Fig. 20), which, of course, results in shifting the racks 375 and the bar 376 toward the front of the machine. The transverse bar 376 has secured to it at one end, (Fig. 19), a forwardly projecting arm 397, said bar 376 also having a series of arms 398, there being one arm 398 for each group of counter-actuating mechanism. Each arm 398 has a pin 399 projecting downwardly from its front end. The arm 398 is of such length that its pin 399, when the bar 376 is shifted forwardly, as just described, will engage one of the long pins 325 of the ratchet 324, as indicated by comparing Figs. 19 and 20, so that if said ratchet has not been left in exactly correct rotative position, it will be returned to that position by the action of the pin 399.

The object of the one long arm 397 extending forwardly from the transverse reciprocating bar 376, is to render it certain that the pawls 358, 358, shall release the arm of the lock-carrying shaft 341. To this end the arm 397 has a downwardly projecting pin [illegible] (Figs. 19 and 23), which pin, when the bar 376 is shifted forwardly, contacts with one end of a lever 401 carried by the [illegible] sleeve 402, suitably mounted [illegible] stationary piece. The other end of the lever 401 has a spring [illegible] connected to [illegible] to hold said lever normally in the position shown in Fig. 19. The lower end of the sleeve 402 has an arm 404 (Figs. 19, 24 and 27), which extends past the two pawls 358, 358, in such location that when the transverse reciprocating bar 376 moves forwardly so that the pin of the arm 397 contacts with one end of the lever 401, the arm 404 of the lever sleeve will push the two pawls in the direction to release the toe 351 of the arm 340 of the lock-carrying shaft, so that the spring which actuates the latter will return all of the locks 348 to the normal position indicated in Fig. 28.

As has been mentioned, manipulation of the knob or handle 115 in one direction operates an electric switch by means of the link 383 shown in Figs. 21 and 22. One end of said link 383 is pivotally connected to a switch 405 which is pivotally connected at 406 to an insulating block 407, which block may have suitable sockets 408, 408, for terminal blocks. The block 407 has a contact 409 for the lower end of the switch 405.

In practice, the electric motor which drives the pulley 97, is connected up with the switch 405, to control the circuit for that motor, the circuit being broken when the switch occupies the position shown in Fig. 22. It will now be understood that when the knob or handle 115 is moved in the direction of the arrow in Fig. 21, to its limit of motion, the link 383 is shifted to the left in Figs. 21 and 22 so as to open the switch. Of course, the motion of the handle in the direction mentioned has at this time lowered all of the treadles 105. When the knob or handle is turned in the other direction to place the entire machine in condition for operation, the transverse bar 376 moves forwardly so as to set the bars hereinbefore described in their proper positions, if they have not been left in accurate positions, the switch 405 at the same time being closed. Further, a final movement of the knob or the handle 115 restores the treadles 105 to their upright positions, ready to be actuated by the finger key levers of the typewriting machine.

We claim:

1. A combined typewriting machine and adding mechanism including selector mechanism, the entire adding mechanism being mounted in fixed lateral position relatively to the frame of the typewriting machine, an upright connected with the selector mechanism, and an adjustable coupler to connect the upright with the carriage of the typewriting machine whereby columns of numerals printed in different lateral positions on the sheet mounted in said carriage may be totalized either by the same group, or any other groups of the indicators of the adding mechanism.

2. In a calculating mechanism having [illegible]

dicators and ratchet pinions associated therewith, reciprocating racks for operating said pinions, bars connected with the racks and having blunt portions to engage the pinions, pivotally mounted arms, and abutments carried by said arms to coöperate with said bars to prevent their separation from the pinions at the end of their operative movement.

3. In a calculating mechanism having indicators and ratchet pinions associated therewith, reciprocating racks for operating said pinions in one direction only, bars connected with the racks and having blunt portions to engage the pinions, pivotally mounted arms, abutments carried by said arms to coöperate with said bars to prevent their separation from the pinions at the end of their operative movement, and a ratchet tooth connected with each of said arms to actuate the pinion at the left for carrying.

4. In a calculating mechanism having indicators and ratchet pinions associated therewith, reciprocating racks for operating said pinions, bars connected with the racks and having blunt portions to engage the pinions, pivotally mounted arms, abutments carried by said arms to coöperate with said bars to prevent their separation from the pinions at the end of their operative movement, a ratchet tooth connected with each of said arms to actuate the pinion at the left for carrying, said ratchet tooth having a cam-faced rear edge, and a fixed abutment to coöperate with said cam-faced edge to hold the ratchet tooth in engagement with said pinion at the left to prevent over motion thereof when carrying.

5. A calculating mechanism comprising in its construction a series of counters or indicators, slides for actuating them, a transverse bar for actuating the slides in one direction, a plate extending across all of said slides, key controlled means for reciprocating the plate a greater or lesser distance according to which key is operated, and a selective device for connecting any one of the slides with said plate to actuate such slide in the other direction.

6. A calculating mechanism comprising in its construction a series of counters or indicators, slides for actuating them, a transverse bar for actuating the slides in one direction, a plate extending across all of said slides, key controlled means for reciprocating the plate a greater or lesser distance according to which key is operated, a selective device for connecting any one of the slides with said plate to actuate such slide in the other direction, and manually operable devices having connections whereby said plate will actuate a slide to an amount according to the particular manual device operated.

7. A calculating mechanism comprising in its construction a series of counters or indicators, slides for actuating them, said slides having pins, a transverse bar crossing the slides behind their pins, a plate extending across all of said slides, connections between said plate and bar whereby they reciprocate in unison, key controlled means for reciprocating the plate a greater or lesser distance according to which key is operated, and a selective device for connecting any one of the slides with said plate.

8. A calculating mechanism comprising in its construction a series of counters or indicators, slides for actuating them, said slides having pins, a transverse bar crossing the slides behind their pins, a transverse plate, connections between said plate and bar whereby they reciprocate in unison, means for reciprocating the plate, and a selective device for connecting any one of the slides with said plate, means being provided whereby said transverse bar may be raised at times above the tops of the pins of the slides.

9. In a calculating apparatus, a plurality of counting indicators, individual actuators therefor independently operable in the usual procedure for calculating, a resetter, means for making connection between said resetter and said actuators, whereby to shift the indicators into their zero-indicating positions, displaceable stops for arresting the several indicators upon arrival thereof in positions in which all show identical indicators, and a controller for said connection-making means and said stops.

10. In a calculating apparatus, a plurality of counting indicators, individual actuators therefor independently operable in the usual procedure for calculating, a resetter, tens-carrying members intermediate adjacent indicators, locks preventing operation of said members, trips carried by said indicators arranged to release said locks, a resetter for moving the indicators simultaneously into uniform position, and detents by which said locks are prevented from release and are converted into stops which arrest the indicators upon arrival there into such position.

11. In a calculating apparatus, a plurality of counting indicators, individual actuators therefor independently operable in the usual procedure for calculating, a resetter, tens-carrying members intermediate adjacent indicators, locks preventing operation of said members, trips carried by said indicators arranged to release said locks, a resetter for moving the indicators simultaneously into uniform position, detents by which said locks are prevented from release and are converted into stops which arrest the indicators upon arrival thereof into such position, and a controller by which said detents are made operative and inoperative, and by which, also, said resetter is put into connection with said actuators.

12. In a calculating apparatus having a plurality of indicators, individual actuators for the several said indicators, a series of manually-operated number keys, connections operated by said keys for operating said actuators, but normally disconnected therefrom, automatic selective mechanism for making connection successively between corresponding actuating members and key-operated connections, and a controller by which simultaneous connection is made between all of said connections and actuators for permitting the indicators to be simultaneously placed in their zero-indicating positions.

13. In a calculating apparatus having a plurality of indicators, individual actuators for the several said indicators, a series of manually-operated number keys, connections operated by said keys for operating said actuators, but normally disconnected therefrom, automatic selective mechanism for making connection successively between corresponding actuating members and key-operated connections, a controller by which simultaneous connection is made between all of said connections and actuators for permitting the indicators to be simultaneously placed in their zero-indicating positions, and stops made operative by said controller for arresting the several indicators when the latter have been moved into position for showing uniform indications.

14. In a calculating apparatus, a plurality of indicators, individual actuators for the several indicators, a series of number keys, intermediate members operated by said number keys, adjacent to the several actuators, but normally out of connection therewith, selective mechanism for making individual connection between the several said members and the actuators adjacent thereto, independent carrying mechanism normally locked against actuation, but arranged to be tripped by the indicators for carrying tens to the next adjacent indicators to the left, a controller, and means operated thereby when in one position to make connection simultaneously between all of said actuators and their corresponding key-operated members, and to lock said carrying mechanism, whereby the latter become stops to arrest the indicators immediately before arrival thereof into their zero-indicating position, said means being operative in another position of the controller to release said carrying mechanism while maintaining connection between the several actuators and key-operated members.

15. In a calculating apparatus, having counting indicators, actuators therefor, and key-operated means for moving said actuators, independent manual means for setting the indicators in zero position including a member for causing the actuators to advance the indicators, displaceable detents for arresting the indicators upon arrival thereof into uniform position, and a controller by which said detents may be made operative and inoperative.

16. In a calculating apparatus, the combination of two or more counting indicators, mounted in fixed lateral position relatively to the frame of the apparatus, an actuator for each indicator, carrying mechanism for advancing the indicator at the left, including a ratchet connected with said indicator and a pawl coöperating with said ratchet, means controlled by the motion of the indicator at the right for actuating said mechanism at the proper time, and means for holding said pawl to prevent separation from the ratchet at the conclusion of the carrying movement and thereby preventing over motion of the indicator.

17. The combination of a plurality of rotary counting indicators, mounted in fixed lateral position relatively to the frame of the apparatus, a ratchet engaged with each of said indicators, a bodily movable pawl engaged with said ratchet, means tending to move said pawl in the direction necessary to rotate the ratchet and indicator, means controlled by the next indicator to the right for permitting actuation of said pawl, and an abutment located on the opposite side of said pawl from the ratchet constructed and arranged to prevent movement of the pawl away from the ratchet.

18. The combination of a plurality of rotary counting indicators, mounted in fixed lateral position relatively to the frame of the apparatus, a ratchet engaged with each of said indicators, a bodily movable pawl engaged with said ratchet, means tending to move said pawl in the direction necessary to rotate the ratchet and indicator, means controlled by the next indicator to the right for permitting actuation of said pawl, said pawl having an inclined cam portion on the side thereof opposite to the ratchet, and an abutment located so as to be engaged by said cam portion during the movement of the pawl so as to prevent movement of the pawl away from the ratchet.

19. In a calculating mechanism, a series of finger key members, indicators actuated thereby, a shaft having means whereby operation of one finger key member will prevent operation of another finger key member, and means whereby said shaft must be given its complete actuation before it can be released for a second operation.

20. The combination with a series of numeral keys, of a series of counters, and connections including a shiftable control plate having a series of notched recesses, means for adjusting said plate in the direction of its length, and means for reciprocating it transversely, and stop devices controlled by the keys for coöperating with said stepped recesses.

21. In a machine of the character described, the combination with a counting mechanism and a series of movable members for controlling the action of the parts thereof, a selector for compelling operative action of separate members, said selector including a laterally movable casing, a series of slides all in one plane mounted in said casing, and being arranged to move in such plane, and means for intermittently shifting the casing and its slides laterally.

22. In a machine of the character described, the combination with a counting mechanism and a series of movable members for controlling the action of the parts thereof, a selector for compelling operative action of separate members, said selector including a laterally movable casing, a series of slides arranged side by side in said casing and mounted and compelled to travel in a straight line, and means for intermittently shifting the casing and its slides laterally.

23. A calculating machine having a series of rotatable spindles carrying indicators and having ratchet pinions side by side, pinions in axial alinement with said spindles, pawls connected with said pinions to engage the ratchet pinions, rack bars engaged with said pinions, and yielding toothed members carried by said rack bars to engage and hold the ratchet pinions when the rack bars are at one extreme of their motion.

24. A calculating machine having a series of rotatable spindles carrying indicators and having ratchet pinions side by side, pinions in axial alinement with said spindles, pawls connected with said pinions to engage the ratchet pinions, rack bars engaged with said pinions, and yielding toothed members carried by said rack bars to engage and hold the ratchet pinions when the rack bars are at one extreme of their motion, means being provided for rigidly holding said yielding toothed members when the rack bars reach such extreme position.

25. A calculating machine having two counters, means for intermittently rotating them, carrying mechanism including a spring-actuated bar having two arms, means coöperating with one arm to hold the rocking bar against movement by its spring and to release it when one counter completes one rotation, means coöperating with the other arm to impart one tenth of a rotation to the other counter, lock devices to prevent over motion of the counters, and means operated by said rocking bar to release the lock device of the counter to which carrying motion is to be imparted.

26. A calculating machine having an actuating carriage composed of two members yieldingly connected, means for moving said carriage, counters, and connections for controlling the actuation of individual counters by movements of said carriage.

27. A calculating machine having an actuating carriage composed of two members, means for positively moving one of said members, yielding connections for transmitting movement of the positively moved member to the other member, counters, and connections for controlling the actuation of individual counters by movements of the yieldingly operated carriage member.

28. A calculating machine having an actuating carriage composed of two members yieldingly connected, means for positively moving one of said members, the other member having a series of lugs, slides adapted to be individually located for operation by said lugs, and counters having connections for actuation by said carriage.

29. A calculating machine having an actuating carriage composed of two members yieldingly connected, means for positively moving one of said members, the other member having a series of lugs, slides adapted to be individually located for operation by said lugs, counters, actuating bars for said counters, and a transverse strip adapted to transmit motion from one of the carriage members to said actuating bars.

30. A calculating machine having an actuating carriage composed of upper and lower members yieldingly connected, means for moving said carriage, counters, selector mechanism for controlling the actuation of individual counters by movements of said carriage, and means for preventing rebounding of the upper carriage member.

31. A calculating machine having an actuating carriage composed of upper and lower members yieldingly connected, means for moving said carriage, counters, a series of slides either one of which is adapted to be moved by the upper member of said carriage, connections between said slides and counters for actuating the latter, and means carried by the lower member of the carriage to return to normal position slides that have been shifted.

32. A calculating machine for operation in connection with a typewriting machine, having a selector mechanism comprising a plurality of laterally shiftable slides independently movable longitudinally, counters, and means for operatively connecting said slides and counters.

33. A calculating machine for operation in connection with a typewriting machine, having a selector mechanism comprising a laterally shiftable two-section casing, slides mounted therein, counters, and means for operatively connecting said slides and counters.

34. A calculating machine for operation in connection with a typewriting machine, having a selector mechanism comprising a laterally shiftable two-section casing, slides mounted therein, a spring connected to the two sections of the casing to draw said sections toward each other, a lever for actuating one section in one direction and the other section in the opposite direction, counters, and means for operatively connecting said slides and counters.

35. A calculating machine for operation in connection with a typewriting machine, having a selector mechanism comprising a plurality of laterally shiftable slides independently movable longitudinally, counters, and means for operatively connecting said slides and counters, said means including a carriage having lugs to engage said selector slides, the spacing of the selector slides differing from the spacing of said lugs.

36. A calculating machine having a shiftable selector mechanism, a laterally movable upright connected therewith, said upright having a coupler, and means for automatically controlling said coupler to cause it to connect with the carriage of a typewriting machine during a portion of the travel of said carriage.

37. A calculating machine having a shiftable selector mechanism, a laterally movable upright connected therewith, said upright having a coupler, and means for automatically controlling said coupler to cause it to connect with the carriage of a typewriting machine during a portion of the travel of said carriage toward the left and return.

38. A calculating machine having a shiftable selector mechanism, a laterally movable upright connected therewith, said upright having a coupler, and means for automatically controlling said coupler to cause it to connect with the carriage of a typewriting machine during a portion of the travel of said carriage, means being provided for breaking the connections of the upright and the selector mechanism at an intermediate point of the movement thereof.

39. A calculating machine having a shiftable selector mechanism, a laterally movable upright connected therewith, said upright having a coupler, and means for automatically controlling said coupler to cause it to connect with the carriage of a typewriting machine during a portion of the travel of said carriage, the mechanism being adjustable to affect the operation of the selector mechanism to permit the calculations to be made during either one of different positions of the typewriter carriage.

40. A calculating machine having counters and a transversely movable rod, a selector mechanism including a lever for controlling the connections with individual counters, means for operating said lever by movements of said rod, an upright connected to said rod, and a rock-shaft carried by said upright and having a coupling member adapted to engage a portion of the carriage of a typewriting machine.

41. A calculating machine having counters and a transversely movable rod, a selector mechanism including a lever for controlling the connections with individual counters, means for operating said lever by movements of said rod, an upright connected to said rod, and a rock-shaft carried by said upright and having a coupling member adapted to engage a portion of the carriage of a typewriting machine, said rock-shaft being adjustably connected to the upright.

42. A calculating machine having a shiftable selector mechanism, a lever for shifting said mechanism, means adapted to be shifted by movements of a typewriter carriage to actuate said lever, the connections between said lever and its actuating means being automatically separable, and means for locking said lever in the position in which it is left by its actuating means when the connections are separated.

43. A calculating machine having a shiftable selector mechanism, a lever for shifting said mechanism, means adapted to be shifted by movements of a typewriter carriage to actuate said lever, the connections between said lever and its actuating means being automatically separable, and means for locking said lever in the position in which it is left by its actuating means when the connections are separated, the locking means being displaceable by the return movement of the lever actuating means.

44. A calculating machine having independent counters, selector mechanism for determining which of the counters shall be connected for actuation, said selector mechanism including a transversely movable stop, a series of slides, and manually controllable means for shifting either one of said slides into the path of movement of said stop.

45. A calculating machine having independent counters, selector mechanism for determining which of the counters shall be connected for actuation, said selector mechanism including a transversely movable stop, a series of slides adapted to be individually shifted into the path of movement of said stop, a series of rock-shafts, each rock-shaft having connections to control the position of one of said slides, and means for manually operating said rock-shafts.

46. A calculating machine having counters, means for operating said counters by power, a series of yieldingly supported depressible members in position to be actuated by numeral key levers of a typewriting machine above said members to connect the power mechanism with either of the counters to actuate the latter, means for holding said members in lowered, inoperative, positions, and another series of depressible members in position to be actuated by the said numeral key levers to control the extent of operation of the counters.

47. A calculating machine constructed to effect subtraction by means of addition, said mechanism having counters, actuators for said counters, numeral keys to control the actuation of the counters, and shiftable devices to alter the effect of the actuators upon the counters either according to the numerals of said keys, or the complement of 9 or the complement of 10, of those numerals.

48. A calculating machine having an actuating carriage provided with spaced projections or lugs, means for reciprocating said carriage, slides to be engaged by said projections or lugs, said slides being transversely movable and unequally spaced.

49. A calculating machine having an actuating carriage provided with spaced projections or lugs, means for reciprocating said carriage, a transversely movable two-section casing having unequally spaced slides adapted to be brought individually into position to be engaged by said projections or lugs.

50. The combination with a typewriting machine, of a calculating mechanism constructed to effect subtraction by means of addition, said mechanism including a series of counters, actuators for said counters, and devices to alter the effect of the actuators upon the counters according to whether an added or subtracted result is to be produced, said devices including a series of independently movable stop members and a shiftable member having notches of varying depth to co-act with said stop members.

51. The combination with a typewriting machine, of a calculating mechanism constructed to effect subtraction by means of addition, said mechanism including a series of counters, actuators for said counters, means for stopping carrying beyond a given point, and devices to alter the effect of the actuators upon the counters according to whether an added or subtracted result is to be produced, said devices including a series of independently movable stop members and a shiftable member having notches of varying depth to co-act with said stop members.

52. A calculating apparatus comprising a series of indicators, a set of finger keys for actuating them, and adjustable connections whereby the said set of finger keys may cause the indicators to show the result of addition or the result of subtraction, said connections including a series of independently movable stop members and a shiftable member having notches of varying depth to co-act with said stop members.

53. A calculating mechanism for use in connection with a typewriting machine, comprising counters, counter-actuating mechanism, a series of treadles spaced to be actuated by key-operated members of the typewriting machine without being connected with said members, said treadles being pivoted and having means for swinging them to an inoperative plane, and controlling devices connected with said treadles for varying the amount of movement that may be imparted to the counters by the counter-actuating mechanism.

54. A calculating mechanism for use in connection with a typewriting machine, comprising counters, counter-actuating mechanism including a notched plate, a series of stop levers adapted to coöperate with said notched plate to determine the amount of movement that may be imparted to the counters, a series of displaceable treadles spaced to be actuated by key-operated members of the typewriting machine without being connected with said members, and connections between said treadles and the stop levers for controlling the positions of said stop levers.

55. A calculating mechanism for use in connection with a typewriting machine, comprising counters, counter-actuating mechanism including a notched plate, a series of stop levers adapted to coöperate with said notched plate to determine the amount of movement that may be imparted to the counters, a series of displaceable treadles spaced to be actuated by key-operated members of the typewriting machine without being connected with said members, and connections between said treadles and the stop levers for controlling the positions of said stop levers, the notched plate being adjustable in the direction of its length, the notches of said plate being irregular and of varying depth.

56. A calculating mechanism for use in connection with a typewriting machine, comprising counters, counter-actuating mechanism including a notched plate, a series of stop levers adapted to coöperate with said notched plate to determine the amount of movement that may be imparted to the counters, and connections with said stop levers for controlling the positions of said stop levers, said connections including means for positively locating the stop levers in position to coöperate with the notched plate.

57. A calculating mechanism for use in connection with a typewriting machine, comprising counters, counter-actuating mechanism, a series of yieldingly supported levers, displaceable treadles connected to said levers, said treadles being spaced to be actuated by key-operated members of the typewriting machine, and controlling devices connected with said treadles for varying the amount of movement that may be imparted to the counters by the counter-actuating mechanism.

58. A calculating mechanism for use in connection with a typewriting machine, comprising counters, counter-actuating mechanism, a series of treadles spaced to be actuated by key-operated members of the typewriting machine, a pair of ratchet disks, pawl mechanism connected with said treadles for engaging the ratchet disks, a series of stop levers adapted to be shifted by the movement of the ratchet disks, and means controlled by said stop levers for varying the amount of movement that may be imparted to the counters by the counter-actuating mechanism.

59. A calculating apparatus having counters, mechanism for actuating either one of the counters, a series of key-operated members for controlling the actuation of said counters, said mechanism including ratchets, positioning pawls for said ratchets, tappets for normally holding said pawls out of operative position, and connections with the key-operated members whereby operative movement of either one of said members will shift a tappet and permit one of the ratchets to be operated while the pawls of the other ratchets remain out of operative position.

60. In a machine of the character described, a series of keys, power-operating mechanism, a series of counters, connections for operating the counters by power under the control of the keys, a rotatable handle, a toothed member rotatable with said handle, two pinions engaged with said toothed member, connections with one of said pinions for controlling the power, and connections with the other pinion for setting the power-driven connections in proper relative positions.

61. In a machine of the character described, a series of keys, power-operating mechanism, a series of counters, connections for operating the counters by power under the control of the keys, a rotatable handle, a toothed member rotatable with said handle, two mutilated pinions engaged with said toothed member, connections with one of said pinions for controlling the power, and connections with the other pinion for setting the power-driven connections in proper relative positions, portions of the said pinions being formed to enter into locked relationship with portions of said toothed member.

62. In a calculating machine having counters and means for actuating them, and also means for resetting them to zero, a rotatable handle having a toothed member, a pinion coöperating with said toothed member, said pinion and toothed member having interlocking portions to hold the said pinion stationary, and operating connections between said pinion and resetting devices.

63. In a calculating machine having counters and means for actuating them, and also means for resetting them to zero, a rotatable handle having a toothed member, a plurality of pinions coöperating with said toothed member and adapted to be successively operated by said toothed member, carrying devices for the counters, connections with one of said pinions for obstructing the carrying mechanism, and connections with another pinion for operating the resetting devices.

64. In a calculating machine having counters and means for actuating them, and also means for resetting them to zero, a rotatable handle having a toothed member, carrying devices between the counters, obstructors for said carrying devices, three pinions coöperating with said toothed member and adapted to be successively operated by said toothed member, actuators for the counters, connections with one of said pinions for actuating the said resetting devices, connections with the second pinion for operating the counter actuators one decimal, and connections with the third pinion for operating the carrying device obstructors.

65. A calculating machine having counters, and means for actuating them, the counters having friction disks, and means for resetting said counters to zero, said means including a manually shiftable strip provided with friction surfaces adapted to engage the friction disks of the counters, said friction surfaces being in staggered relationship relatively to each other, and the friction disks of the counting devices being relatively located so that each friction surface of the strip can operate but one friction disk.

66. A combined typewriting machine and calculating apparatus, the latter having counters and power mechanism adapted to actuate said counters under the control of numeral keys of the typewriting machine, a movable support, a detent pawl connected with said movable member and adapted to engage the rack, said pawl being normally disengaged from the rack, connections whereby the depression of a numeral key will cause the pawl to engage the rack, and means operated by the power mechanism for removing the pawl from the rack upon the completion of a counting operation.

67. A calculating apparatus having a series of counters, depressible members and connections whereby either member will control the actuation of either counter, and locking mechanism comprising a rock-shaft having a series of arms adapted to engage the depressible members to lock down the one which has been depressed, and simultaneously lock the other members against depression.

68. A calculating apparatus having a series of counters, depressible members and connections whereby either member will control the actuation of either counter, said connections including a control plate, and a series of stop arms for said control plate, a ratchet for shifting each stop member, a pawl and pawl carrier for each ratchet, and a rock-shaft having a series of arms adapted to simultaneously engage the pawl carriers to lock down the pawl carrier which has been operated by a depressible member, and to lock the other pawl carriers against operation.

69. A calculating apparatus having a series of counters, depressible members and connections whereby either member will control the actuation of either, counter, and locking mechanism comprising a rock-shaft having a series of arms adapted to engage the depressible members to lock down the one which has been depressed, and simultaneously lock the other members against depression, means being provided for holding the rock-shaft and its locking arms in locking position until the operation of the counters has been completed.

70. A calculating apparatus having a series of counters, depressible members and connections whereby either member will control the actuation of either counter, and locking mechanism comprising a rock-shaft having a series of arms adapted to engage the depressible members to lock down the one which has been depressed, and simultaneously lock the other members against depression, means being provided for holding the rock-shaft and its locking arms in locking position until the operation of the counters has been completed, said means comprising an arm projecting from the rock-shaft, and two detent pawls adapted to engage said arm, the detent portions of said pawls being at different distances from the pivots of the pawls, means being provided for releasing said detent pawls from the rock-shaft arm after the completion of the calculating operation.

In testimony whereof, we have affixed our signatures, in presence of two witnesses.

EMILY M. PALMER,
HAROLD V. PALMER,
WALTER H. ROBERTS,
*Executors of the Estate of Edward H. Palmer.*

WILLIAM S. KINSLEY.

Witness to W. H. R., E. M. P., H. V. P., and W. S. K.:
HERBERT M. VIALL.

Witness to E. M. P., H. V. P., and W. S. K.:
GRACE V. VIALL.

Witness to W. H. R.:
LIZZIE B. MACKAY